(12) United States Patent
Kubisiak et al.

(10) Patent No.: US 6,223,593 B1
(45) Date of Patent: *May 1, 2001

(54) SELF-OSCILLATING FLUID SENSOR

(75) Inventors: David Kubisiak, Chanhassen; Ulrich Bonne, Hopkins, both of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/001,735

(22) Filed: Dec. 31, 1997

(51) Int. Cl.$^7$ ......................................................... G01F 1/68
(52) U.S. Cl. ......................................................... 73/204.15
(58) Field of Search ............................. 73/204.15, 204.26

(56) References Cited

U.S. PATENT DOCUMENTS

| | | | |
|---|---|---|---|
| 3,015,232 | 1/1962 | Schnoll | 73/204 |
| 3,335,606 | 8/1967 | Scarpa | 73/204 |
| 3,783,356 | 1/1974 | Lide, III et al. | 318/18 |

(List continued on next page.)

FOREIGN PATENT DOCUMENTS

| | | |
|---|---|---|
| 2 934 566 A1 | 3/1981 | (DE) . |
| 32 34 146 A1 | 3/1984 | (DE) . |
| 42 22 458 A1 | 1/1994 | (DE) . |
| 42 43 573 A1 | 6/1994 | (DE) . |
| 296 07 315 U1 | 9/1996 | (DE) . |
| 196 19 133 A1 | 11/1997 | (DE) . |
| 0 232 719 | 1/1987 | (EP) . |
| 0 348 245 A2 | 12/1989 | (EP) . |
| 0 364 982 A1 | 4/1990 | (EP) . |
| 0 419 873 A2 | 8/1990 | (EP) . |
| 0 468 793 A2 | 1/1992 | (EP) . |
| 0 702 212 A2 | 3/1996 | (EP) . |
| 0 773 432 A2 | 5/1997 | (EP) . |
| 2 287 792 | 9/1995 | (GB) . |
| 56-153256 | 11/1981 | (JP) . |
| 57-131029 | 8/1982 | (JP) . |
| 57-206830 | 12/1982 | (JP) . |
| WO 92/06369 | 4/1992 | (WO) . |
| WO 94/20825 | 9/1994 | (WO) . |

OTHER PUBLICATIONS

Bonne et al., "Burstproof, Thermal Pressure Sensor for Gases", 1994 Solid State Sensor and Actuator Workshop, 2 pages.

Lambert et al., "An air flow sensor based on interface thermal wave propagation", *J. Appl. Phys.*, 59(1), Jan. 1986, 3 pages.

Bonne et al., "Natural Gas Flow and Property Sensor", *GRI Engine Technology Advisory Committee Meeting*, May 1996, 5 pages.

Healy et al., "The Theory of the Transient Hot–Wire Method for Measuring Thermal Conductivity", *Physics*, 82C (1976) pp. 392–408.

Protodynakonow et al., "The Use of Probes in Investigating Two–Phase Flow", *Fluid Mech., Soviet Res.*, 12, No. 3, (May–Jun. 1983), pp. 98–157.

Carslaw et al., "Conduction of Heat in Solids", $2^{nd}$ Edition, Clarendon Press, Oxford, UK (1959), 7 pages.

Mylroi, "Cross–Correlation Flow Measurement Systems", *G.B.*, 12, No. 6–7, 1977, 4 pages.

(List continued on next page.)

Primary Examiner—Benjamin R. Fuller
Assistant Examiner—Jewel V. Thompson
(74) Attorney, Agent, or Firm—John G. Shudy, Jr.

(57) ABSTRACT

A method and apparatus for determining selected fluid properties using a self-oscillating fluid sensor. In a preferred embodiment, a sensor is provided that oscillates at a frequency that is related to the transit time of a temperature disturbance through the fluid. Based on the transit time, selected fluid properties of the fluid can be determined.

46 Claims, 12 Drawing Sheets

U.S. PATENT DOCUMENTS

| | | |
|---|---|---|
| 4,043,196 | 8/1977 | Trageser ................................. 73/204 |
| 4,228,815 | 10/1980 | Juffa et al. . |
| 4,279,147 | 7/1981 | Djorup ................................... 73/189 |
| 4,478,076 | 10/1984 | Bohrer .................................... 73/204 |
| 4,483,200 | 11/1984 | Togawa et al. . |
| 4,507,974 | 4/1985 | Yelderman ........................ 73/861.06 |
| 4,576,050 | 3/1986 | Lambert ........................... 73/861.05 |
| 4,682,503 | 7/1987 | Higashi et al. ......................... 73/755 |
| 4,713,970 | 12/1987 | Lambert ........................... 73/861.05 |
| 4,735,082 | 4/1988 | Kolloff ................................. 73/27 R |
| 4,909,078 | 3/1990 | Sittler et al. . |
| 4,944,035 | 7/1990 | Aagardl et al. ...................... 364/556 |
| 4,961,348 | 10/1990 | Bonne ............................... 73/861.02 |
| 5,031,126 | 7/1991 | McCulloch et al. ................. 364/557 |
| 5,044,766 | 9/1991 | Stuart ..................................... 374/43 |
| 5,056,047 | 10/1991 | Sondergeld . |
| 5,146,414 | 9/1992 | McKown et al. .................... 364/510 |
| 5,150,611 | 9/1992 | Kleinhans ......................... 73/204.14 |
| 5,184,509 | 2/1993 | Kienzle et al. .................... 73/204.14 |
| 5,193,388 | 3/1993 | Kleinhans ......................... 73/204.14 |
| 5,237,523 | 8/1993 | Bonne et al. ..................... 364/571.03 |
| 5,243,858 * | 9/1993 | Erskine et al. .................... 73/204.26 |
| 5,247,156 | 9/1993 | Favre ................................... 219/209 |
| 5,263,380 | 11/1993 | Sultan et al. . |
| 5,303,167 | 4/1994 | Bonne .................................. 364/556 |
| 5,379,630 | 1/1995 | Lacey ................................. 73/25.03 |
| 5,463,899 | 11/1995 | Zemel et al. . |
| 5,533,412 | 7/1996 | Jerman et al. .................... 73/861.95 |
| 5,587,520 | 12/1996 | Rhodes ............................... 73/25.03 |
| 6,019,505 * | 2/2000 | Bonne et al. .......................... 374/40 |

OTHER PUBLICATIONS

Kubisiak et al, "Microamemometer–Based Gas Flow Sensing", *IGT Symposium of Natural Gas Quality Measurement*, Jul. 1990, 18 pages.

Dipl.–Ing. Dr. techn. Wolfgang Wehrmann et al., "Korrelationstechnik", *Expert Verlag*, Grafenau, XP002094984, 173 pages, 1980.

S.R. Atalla et al. "Measurement of Thermal Properties of Liquids with an AC Heated–Wire Technique", *International Journal of Thermophysics*, vol. 2, No. 2, 1981.

Sobhy R. Atalla et al., "Radiation Effects with the AC Heated Strip Technique for the Measurement of Thermal Properties of Liquids", *High Temperatures—High Pressures*, vol. 17, pp. 447–452, 1985.

* cited by examiner

SELF-OSCILLATING FLUID SENSOR

CROSS REFERENCE TO CO-PENDING APPLICATIONS

The present application is related to U.S. patent application Ser. No. 09/002,156, filed Dec. 31, 1997, entitled "METHOD AND APPARATUS FOR MEASURING SELECTED PROPERTIES OF A FLUID OF INTEREST USING A SINGLE HEATER ELEMENT", U.S. patent application Ser. No. 09/001,530, filed Dec. 31, 1997, entitled "TIME LAG APPROACH FOR MEASURING THERMAL CONDUCTIVITY AND SPECIFIC HEAT", U.S. patent application Ser. No. 09/002,157, filed Dec. 31, 1997, entitled "TIME LAG APPROACH FOR MEASURING FLUID VELOCITY", and U.S. patent application Ser. No. 09/001,453, filed Dec. 31, 1997, entitled "FLUID PROPERTY AND FLOW SENSING VIA A COMMON FREQUENCY GENERATOR AND FFT", which are all assigned to the assignee of the present invention and incorporated herein by reference.

BACKGROUND OF THE INVENTION

1. Field of the Invention

The present invention generally relates to the determination of fluid properties and, more particularly, to the determination of the thermal conductivity, thermal diffusivity, specific heat and fluid velocity of a fluid of interest.

2. Description of the Prior Art

A number of approaches have been devised to measure the thermal conductivity, thermal diffusivity, specific heat and fluid velocity of a fluid of interest. Typically, these and other properties are detected through the use of various types of detectors including resistive bridge type sensors.

One approach for determining thermal conductivity is described in U.S. Pat. No. 4,735,082 in which a heated element in one leg of a Wheatstone Bridge is placed or positioned in a cavity through which the sample fluid of interest is passed. The heated element is used to introduce a series of amounts of thermal energy into the fluid of interest at various levels by varying the input voltage via alternating current, voltage or power so that the changes in dissipated power caused by changes in the thermal properties of the surrounding fluid can be detected as voltage, current or resistance change signals. One of the measurable fluid properties is the thermal conductivity of the fluid.

Further to the measurement of thermally induced changes in electrical resistance, as will be discussed in greater detail below, especially with reference to prior art FIGS. 1–5, very small and very accurate "microbridge" or "micromembrane" semiconductor chips supporting sensors have been described in which such microelements are used as heaters and sensors. Such sensors might include, for example, a pair of thin film sensor elements around a thin film heater element for measuring flow rates. Semiconductor chip sensors of the class described are treated in a more detailed manner in one or more of patents such as U.S. Pat. No. 4,478,076, U.S. Pat. No. 4,478,077, U.S. Pat. No. 4,501,144, U.S. Pat. No. 4,651,564, and U.S. Pat. No. 4,683,159, all of common assignee with the present invention.

Another approach for measuring the thermal conductivity, thermal diffusivity and specific heat of a fluid is disclosed in U.S. Pat. No. 4,944,035 to Aagard et al. Aagard et al. discloses using a microbridge structure that has a heater film and at least one spaced sensor films. A pulse of electrical energy is applied to the heater at a level and duration such that both a transient change and a substantially steady-state temperature occur at the sensor. The thermal conductivity of the fluid of interest is determined based upon a known relation between the sensor output and the thermal conductivity at steady-state sensor temperatures. The specific heat and thermal diffusivity of the fluid of interest are determined based on a known relation among the thermal conductivity, the rate of change of the sensor output during a transient temperature change in the sensor, and the thermal diffusivity and specific heat.

A typical approach for determining the velocity of a fluid of interest is to determine the time require for a thermal wave to flow from a source heater element to a destination sensor element. By knowing the distance between the heater element and the sensor element, the velocity of the fluid can be calculated. This approach is suggested in U.S. Pat. No. 4,576,050 to Lambert. Lambert energizes a heater strip with an oscillating heater input signal to emit thermal waves in the fluid. The thermal waves propagate through the fluid at a rate that is dependent on the fluid velocity that flows perpendicular to the heater strip. A thermo-electric detector, spaced from one or both side of the heater, senses the thermal wave and provides a corresponding detector output signal. The velocity of the fluid is determined, at least to first order, from the time differential between the heater input signal and the detector output signal.

A limitation of many of the above prior art approaches is that a substantial amount of support hardware and/or software are required. For example, in many of the prior art approaches, a frequency generator is used to provide a frequency input signal to the heater element. Frequency generators can be relatively expensive, both in terms of hardware and power. Likewise, many of the prior art approaches require one or more high frequency timers to measure the time or phase lag between the heater input signal and a corresponding temperature disturbance in the fluid. Like fixed frequency generates, high frequency timers can be relatively expensive, both in terms of hardware and power.

SUMMARY OF THE INVENTION

The present invention overcomes many of the disadvantages associated with the prior art by providing a self-oscillating fluid sensor that does not require a frequency generator or a high frequency timer to determine desired fluid properties. Rather, the sensor self-oscillates at a frequency that is related to the transit time of a temperature disturbance through the fluid. From the measured frequency, selected properties of the fluid can be determined.

Because the present invention senses the changes in fluid properties via changes in the frequency of oscillation, whereby the variability of the involved microresistive heater and sensor elements only have a second order influence, the variability of temperature compensation adjustments also are reduced because they now more strongly depend on the well known and invariant thermal properties of the reference fluid.

In a first illustrative embodiment of the present invention, a heater element and a spaced sensor element are disposed in and closely coupled to the fluid medium (fluid or gas) of interest. The sensor output is coupled to the heater input via a feedback path. A desired phase shift is provided between the sensor output and the heater input so that the sensor oscillates at a frequency that is related to the transit time of the temperature disturbance through the fluid. As further described below, the thermal conductivity, thermal diffusivity, specific heat and velocity of the fluid can be determined from the frequency of oscillation of the sensor.

More specifically, a heater means and a sensor means are provided in thermal communication with the fluid of interest. A heater energizing means is connected to the heater means for energizing the heater means. A feedback means is coupled to the sensor means and the heater energizing means for causing the heater energizing means to energize the heater means a predetermined time or phase shift after the resistance of the sensor means changes by a predetermined amount. In this configuration, the heater energizing means, heater means, sensor means, and feedback means form a closed loop that oscillates at a frequency that is related to a time lag between the energizing of the heater means and the change of resistance of said sensor means. From the frequency of oscillation, the desired fluid property or properties can be determined.

To determine the thermal conductivity, thermal diffusivity and specific heat of the fluid of interest, the sensor is preferably exposed to the fluid at substantially zero flow. In one embodiment, selected calibration information is stored that relates the frequencies of oscillation (or corresponding time lag) to desired fluid properties. As noted in U.S. Pat. No. 4,944,035 to Aagard et al., the thermal conductivity of the fluid of interest can most effectively be determined when a substantially steady-state temperature occur at the sensor, and the thermal diffusivity of a fluid of interest can most effectively be determined when a transient temperature change occurs at the sensor. Accordingly, it is contemplated that the phase delay introduced by the feedback means may be controlled so that the frequency of oscillation is relatively low when determining the thermal conductivity of the fluid of interest, and higher when determining the thermal diffusivity of the fluid of interest. In either case, appropriate calibration information may be provided to relate the frequency of oscillation to the desired property of the fluid of interest.

With respect to fluid velocity, it has been found that the frequency of oscillation of the sensor device is related to the flow rate of the fluid. By providing the appropriate calibration information, the velocity of the fluid of interest may be determined from the frequency of oscillation of the sensor device.

In another illustrative embodiment, it is contemplated that a phase lag (or corresponding delay time) may be determined between two sensor elements, rather than between the heater element and a sensor element. In this embodiment, a heater means is provided in thermal communication with the fluid of interest. A heater energizing means is then connected to the heater means for energizing the heater means, and to provide a temperature disturbance in the fluid of interest. Then, at least two sensor means are provided in thermal communication with the fluid of interest. Each of the at least two sensor means are preferably spaced a different distance from the heater means.

A first transit time corresponding to the time required for the temperature disturbance to travel from the first sensor means to the second sensor means is determined. In a first embodiment, this is accomplished by determining a first delay between the heater input signal (or temperature response of the heater means) and the corresponding resistance change of the first sensor means. The first delay can be determined using any number of means including providing a feedback loop as described above between the heater means and the first sensor means, and relating the frequency of oscillation to the delay therebetween, or by providing a high frequency timer. A second delay may be determined between the heater input signal (or temperature response of the heater means) and the corresponding resistance change of a second sensor in a similar manner. The first transit time may then be calculated by subtracting the first delay from the second delay.

An advantage of this approach is that several potential error sources in the phase differential measurement are canceled during the subtraction step, thereby increasing the accuracy of the measurement. One such error source is the non-zero heater time lag that typically exists between the heater input signal and the elevated temperature response of the heater element (and thus the fluid). Another potential error source is the non-zero sensor time lag that typically exists between the arrival of the temperature disturbance at the sensor element and the corresponding response of the sensor element. That is, the temperature of the sensor element typically does not react instantaneously to a temperature change in the fluid, primarily due to the sensors non-zero thermal mass.

By subtracting the first delay between the heater input signal (or temperature response of the heater means) and the corresponding resistance change of the first sensor means from the second delay between the heater input signal (or temperature response of the heater means) and the second sensor means, many of the potential error sources are effectively canceled, thereby resulting in a more accurate time delay measurement.

In another illustrative embodiment, the first sensor element may be included in a first feedback loop and the second sensor element may be included in a second feedback loop. Both the first and second feedback loops may include a common heater element, or may include separate heater elements. A beat frequency can be determined from the oscillation frequencies of the first feedback loop and the second feedback loop. The transit time from the first sensor element to the second sensor element can be determined from the beat frequency.

In yet another illustrative embodiment, two similar constructed self-oscillating heater/sensor pairs may be provided, one subject to substantially zero flow conditions and the other subject to flow conditions. A first frequency of oscillation is determined for the heater/sensor pair that is subject to substantially zero flow. A second frequency of oscillation is determined for the heater/sensor pair that is subject to flow conditions. Because the structure and spacings are preferably substantially identical for both heater/sensor pairs, the first transit time can be calculated from the beat frequency of the first frequency and the second frequency.

As more fully described below, if the fluid is at substantially zero flow, the first transit time from the first sensor means to the second sensor means may be used to calculate the thermal conductivity, thermal diffusivity and specific heat of the fluid of interest. If the fluid is under flow conditions, the first transit time may be used to calculated the velocity of the fluid of interest.

It is also contemplated that a second transit time between the first sensor means and a third sensor means may be determined, preferably in the manner described above. That is, a third delay may be determined between the heater input signal (or temperature response of the heater means) and a third sensor means. The second transit time between the first sensor and the third sensor may be determined by subtracting the first delay between the heater input signal (or temperature response of the heater means) and the corresponding resistance change of the first sensor means from the third delay between the heater input signal (or temperature response of the heater means) and the third sensor means.

In another illustrative embodiment, the first and third sensor means are included in separate feedback loops. The second transit time may then be determined from a beat frequency between the oscillation frequencies of the first and third sensor means. From the beat frequency, the second transit time can be determined.

Finally, it is contemplated that a two self-oscillating heater/sensor pairs each having a different heater-to-sensor spacing may be provided and subject to substantially zero flow conditions. Two corresponding similarly constructed self-oscillating heater/sensor pairs may be provided and subjected to flow conditions. Because the structure and spacings of the corresponding heater/sensor pairs are preferably substantially identical, both a first transit time and a second transit time can be determined from the beat frequencies of the corresponding oscillation frequencies under flow and no-flow conditions.

Once the first and second transit times have been determined, the velocity of the fluid of interest can be calculated, relatively independently of the fluid properties, using a relation that is more fully described below.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The present invention, then, is directed to a self-oscillating fluid sensor that does not require a frequency generator to determine selected fluid properties. The sensor self-oscillates at a frequency that is related to the transit time of a temperature disturbance through the fluid. Using the transit time, selected fluid properties of the fluid can be determined.

In at least one embodiment of the present invention, one or more high frequency timers are provided to measure selected delay times or frequencies. However, in these embodiments, the heater element and a first sensor element preferably form a closed loop that oscillate at a selected frequency. Thus, this configuration still eliminate the need for a frequency generator.

Finally, it is contemplated that the frequencies or transit times between two or more sensor elements may be used to determined selected fluid properties, rather than the delay times between a heater element and selected sensor elements. This may help reduce several error sources that are present in a traditional transit time measurement from a heater element to a sensor element. Moreover, the use of differences in transit times or frequencies (e.g. beat frequencies) may offer advantageous sensing approaches.

The microbridge semiconductor chip sensor contemplated, for example, in certain embodiments preferred for the invention may resemble the form of one or more of the microbridge systems illustrated in U.S. Pat. No. 4,478,076, U.S. Pat. No. 4,478,077, U.S. Pat. No. 4,501,144, U.S. Pat. No. 4,651,564, U.S. Pat. No. 4,683,159, and U.S. Pat. No. 4,994,035, all of common assignee with the present invention.

Figure 1:
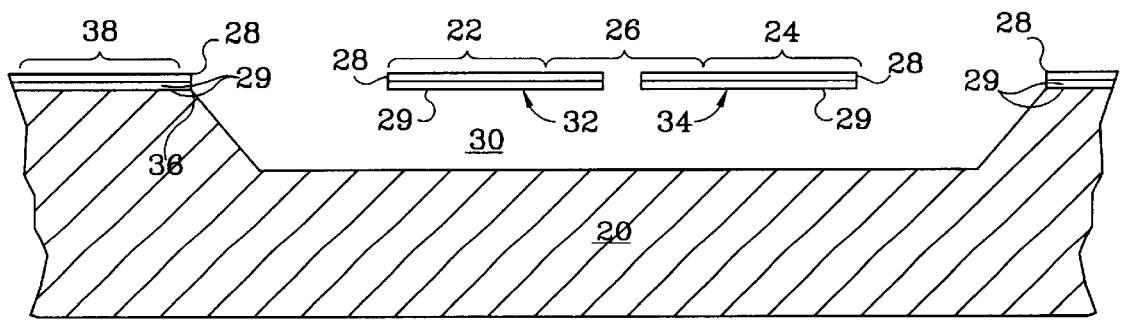
FIGS. 1, 2 and 3 are different views of a prior art embodiment of a microbridge flow sensor.
Figure 2:
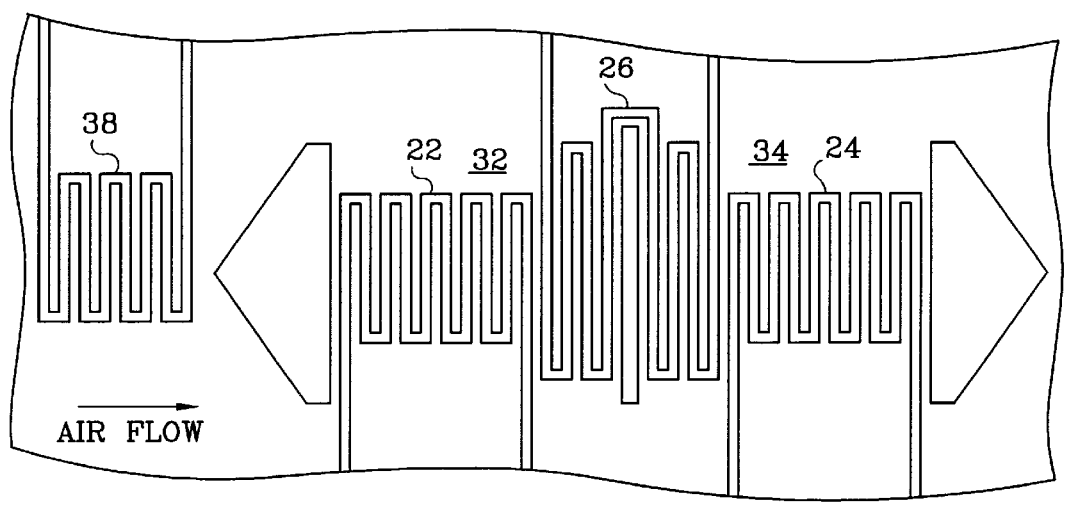
Figure 3:
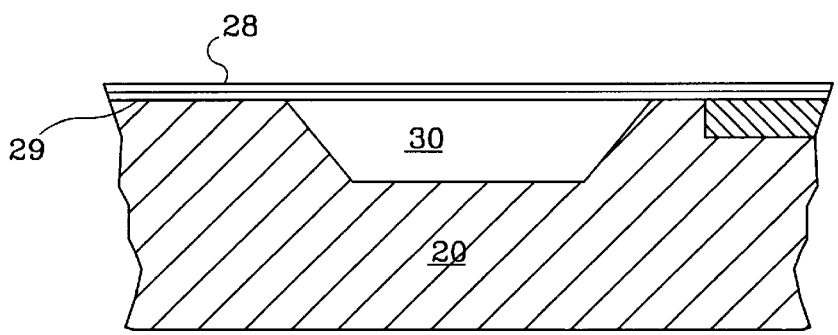

Such a system is exemplified by FIGS. 1–3 taken from U.S. Pat. No. 4,994,035 to Aagard et al. A discussion of that example will now be presented as it will be helpful in understanding the present invention. While the present discussion is believed sufficient, to the extent necessary, any additional material contained in the microbridge related patents cited is deemed to be incorporated herein by reference.

The prior art system of FIGS. 1–3 contemplates a pair of thin film temperature sensors 22 and 24, a thin film heater 26 and a support member 20 supporting the sensors and heater out of contact with the base substrate. Sensors 22 and 24 are shown disposed on opposite sides of heater 26. Support member 20 is preferably a non-conductive isolating or semiconductive material. A silicon was chosen here because of its adaptability to precision etching techniques and ease of electronic chip producibility. The embodiment includes two identical temperature sensing resistor grids 22 and 24 acting as the thin film heat sensors and a centrally located heater resistor grid 26 acting as the thin film heater.

Sensors 22 and 24 and heater 26 may be fabricated of any suitable, stable metal or alloy film. The metal used may be a platinum or nickel-iron alloy sometimes referred to as permalloy, with a composition of 80 percent nickel and 20 percent iron. The sensor and heater grids are encapsulated in a thin film of dielectric, typically comprising layers 28 and 29 and preferably silicon nitride, $Si_3N_4$ to form the film members. Other thin film materials may include $SiO_2$, MgO, $Si_3N_4$, $N_2O_3$, etc.

In FIGS. 1 and 2, the sensor comprises two thin film members 32 and 34, with member 32 comprising sensor 22 and member 34 comprising sensor 24, each member comprising one-half of heater 26 and having a preferred dimension of 150 microns wide and 400 microns long.

The system further describes an accurately defined fluid space (liquid or gas) 30 that effectively surrounds elements 22, 24, 26, and is achieved by fabricating the structure on silicon surface 36. Thin film elements 22, 24 and 26 have thicknesses of approximately 0.08 to 0.12 micron with line widths on the order to 5 microns and spaces between lines on the order of 5 microns. The elements encapsulated in the silicon nitride film preferably have a total thickness of approximately 0.8 microns or less. The fluid space 30 may be fabricated by subsequently etching an accurately defined silicon-free depression of about 100 microns deep into silicon body 20 beneath members 32 and 34.

Members 32 and 34 connect to top surface 36 of semiconductor body 20 at one or more edges of etched-pit or depression 30. As illustrated in FIG. 3, members 32 and 34 may be bridged across depression 30; alternately, for example, members 32 and 34 could be cantilevered over depression 30.

In the system shown, heat flows from the heater to the sensor by means of both solid and fluid couplings therebetween. Of note is the fact that silicon nitride ($Si_3N_4$), besides being a good electrical insulator, is an effective solid thermal insulator. Because the connecting silicon nitride film within members 32 and 34 is a fairly good thermal insulator, heat transmission through the solid does not dominate the propagation of heat from heater 26. This further enables the relative amount of the heat conducted to sensing resistors 22 and 24 from heater resistor 26 by flow through the surrounding fluid rather than through the supporting nitride film. Moreover, the supporting silicon nitride film has a low enough thermal conductivity that sensing resistor grids 22 and 24 can be located immediately adjacent or juxtaposed to heating resistor grid 26. Thus, sensing resistor grids 22 and 24 are in effect suspended rigidly in the fluid space proximate heater resistor 26 and act as thermal probes to measure the temperature of the fluid near and in the plane of heater resistor grid 26.

Figure 4:
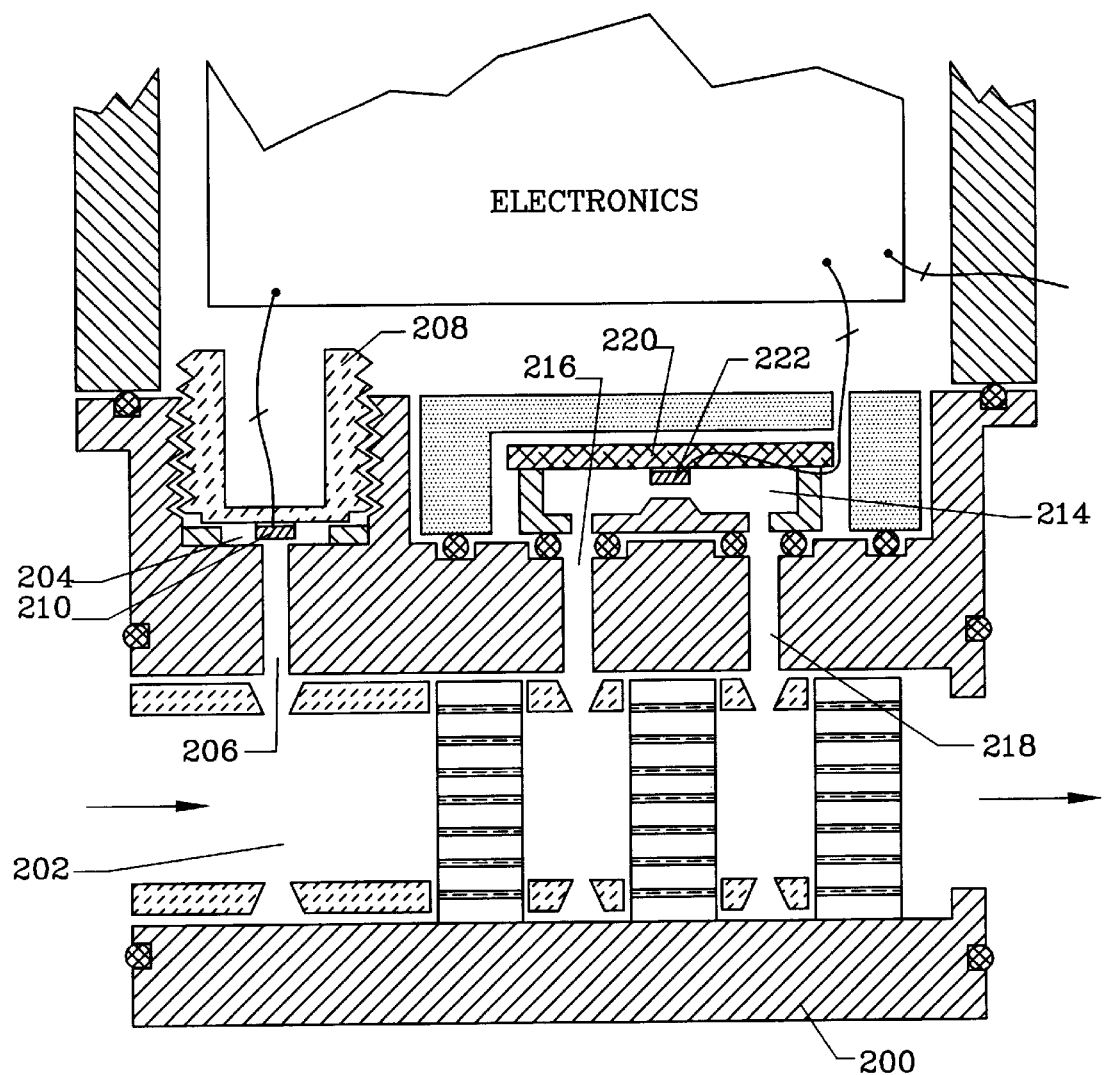
FIG. 4 is a partial cut-away view of a microbridge sensor system.

FIG. 4 is a partial cut-away view of a microbridge sensor system placed in line with a flow pipe. A main flow channel 200 having a central bore 202 is connected to the pipe that carries a fluid of interest. A first chamber 204 is in fluid communication with the central bore 202 of the main flow channel 200 via a single bore 206. A header 208 having a first microbridge or micromembrane sensor 210 mounted thereto is inserted into the first chamber 204 and secured to the main flow channel 200 as shown. In this configuration, the first microbridge sensor is exposed to the fluid of interest with substantially zero flow. The first microbridge sensor 210 is typically used to measure fluid properties such as thermal conductivity, thermal diffusivity, specific heat, temperature and pressure.

A second sensor 222 is positioned in a bypass channel 214. In this configuration, the second microbridge sensor 222 is exposed to the flow of the fluid of interest. The second microbridge sensor 222 is typically used to measure fluid velocity.

Figure 5:
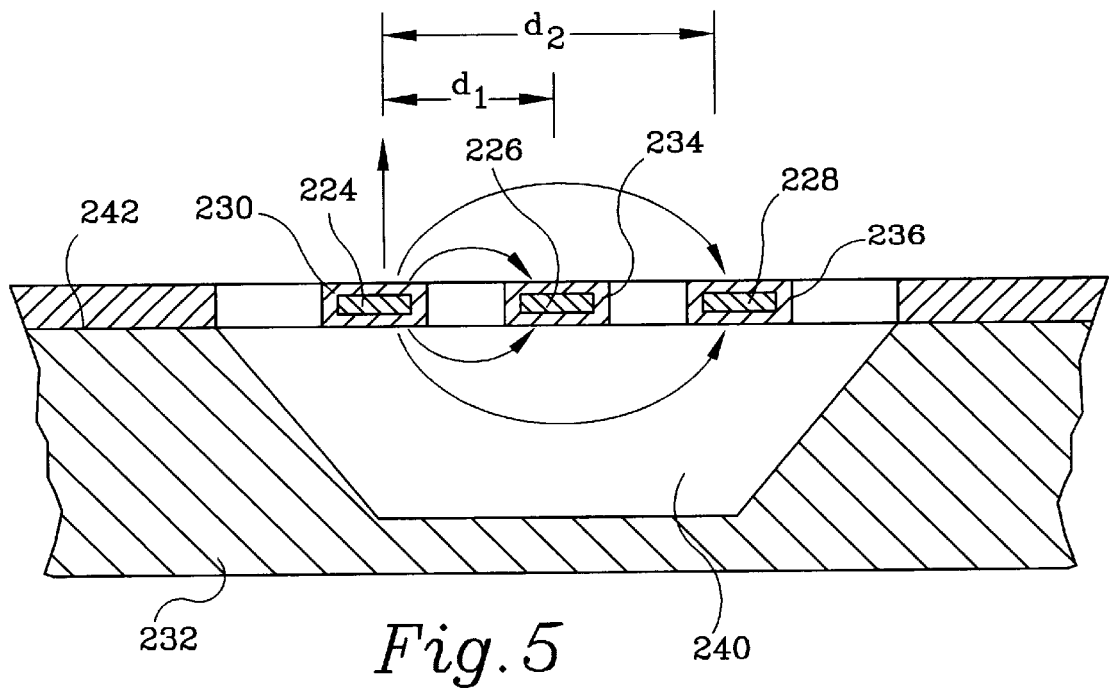
FIG. 5 is a first illustrative cross sectional view of a microbridge sensor in accordance with the present invention having two downstream sensor elements.

FIG. 5 is a first illustrative cross sectional view of a microbridge sensor in accordance with the present invention, having two downstream sensor elements. When using calibration data to measure the thermal conductivity, thermal diffusivity, specific heat and/or velocity of a fluid of interest, only one heater element and one sensor element may be required. However, as discussed in more detail below, some embodiments of the present invention include a heater element 224 and at least two spaced sensor elements 226 and 228. For example, when measuring fluid velocity, at least two sensor elements 226 and 228 may be provided, each spaced a different distance from the heater element 224. In the illustrative diagram, sensor 226 is spaced a first distance "$d_1$" from the heater element 224, and sensor 228 is spaced a second distance "$d_2$" from the heater element 224. Both sensor 226 and 228 are shown downstream from the heater element 224.

The heater element 224 is shown having a support member 228 that supports the heater element 230 out of contact with the base substrate 232. Together, the heater element 224 and support member 230 form a heater film member. Likewise, the sensor element 226 is shown having a support member 234 that supports the sensor element 226 out of contact with the base substrate 230. Together, the sensor element 226 and support member 234 form a first sensor film member. Finally, the sensor element 228 is shown having a support member 236 that supports the sensor element 228 out of contact with the base substrate 230. Together, the sensor element 228 and support member 236 form a second sensor film member.

Heater element 224 and sensor elements 226 and 228 may be fabricated of any suitable, stable metal or alloy such as platinum, nickel, iron-nickel, etc. Heater element 224 and sensor elements 226 and 228 may be any resistive element including a wire, but are preferably a film. Moreover, heater element 224 and sensor elements 226 and 228 may be of any shape including a grid pattern as described above, or simply a line. As indicated above, the heater element 224 and sensor elements 226 and 228 are preferably encapsulated in a thin film of dielectric, such as $Si_3N_4$, $SiO_2$, MgO, $Si_3N_4$, $N_2O_3$, to form the support members 230, 234 and 236.

An accurately defined fluid space 240 is preferably provided which effectively surrounds heater element 224 and sensor elements 226 and 228, and is achieved by fabricating the structure on silicon surface 242. Heater element 224 and sensor elements 226 and 228 preferably have thicknesses of approximately 0.08 to 0.12 micron, with line widths on the order to 5 microns and, if a grid is used, spaces between lines on the order of 5 microns. The fluid space 240 may be fabricated by subsequently etching an accurately defined depression about 100 microns deep into silicon substrate 232 beneath heater element 224 and sensor elements 226 and 228. Another method may include forming a membrane structure by etching the silicon out from the back of the silicon substrate 232.

Support member 230 and heater element 224 preferably connect to top surface 242 of semiconductor substrate 232 at one or more edges of etched-pit or depression 240. Support member 230 and heater element 224 may bridge across depression 240 as shown, or alternately, for example, may be cantilevered over depression 240. The sensor elements 234

226 and 228 are preferably similarly constructed. It is recognized that any number of heater and sensor elements may be provided in a like manner. However, for illustration purposes, only one heater element 224 and two sensor elements 226 and 228 are shown in FIG. 5.

The heater element 224 produces a thermal disturbance in the fluid. Each of the sensor elements 226 and 228 may sense the arrival of the thermal disturbance at their respective locations. Of interest is the transit times for the temperature disturbance to travel from the heater element 224 to each of the sensor elements 226 and 228. As described more fully below, because the sensor elements 226 and 228 are spaced at different distances from the heater element, the fluid velocity can be determined relatively independently of the fluid properties, especially of the spacings are large compared to the diffusion-governed displacements.

Figure 6:
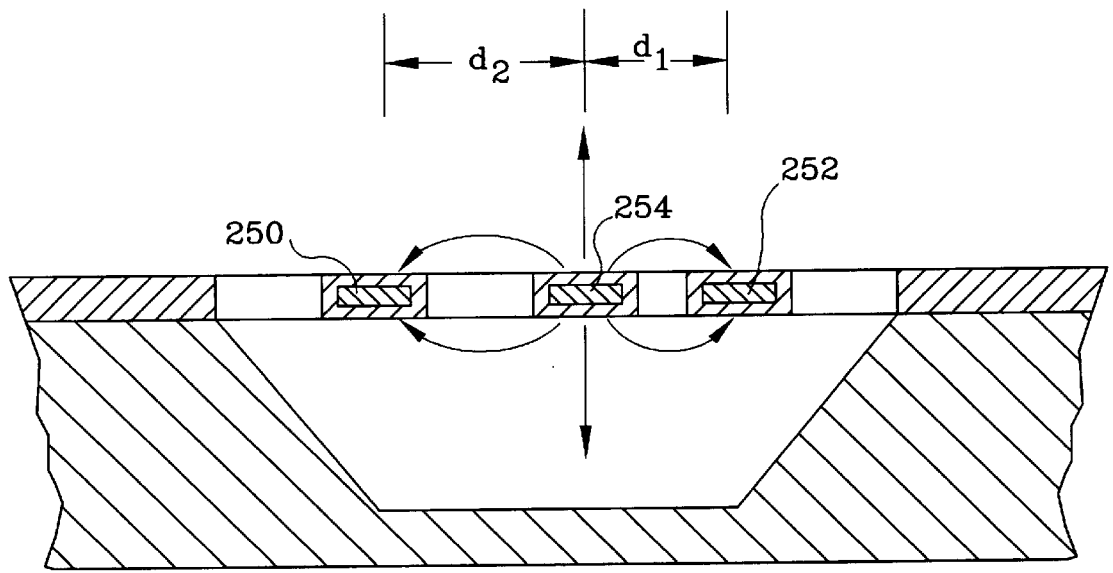
FIG. 6 is a second illustrative cross sectional view of a microbridge sensor in accordance with the present invention having an upstream and a downstream sensor element.

Rather than providing both sensors downstream from the heater element as shown in FIG. 5, it is contemplated that one sensor element 250 may be placed upstream and another sensor 252 may be placed downstream of the heater element 254, as shown in FIG. 6.

Figure 7:
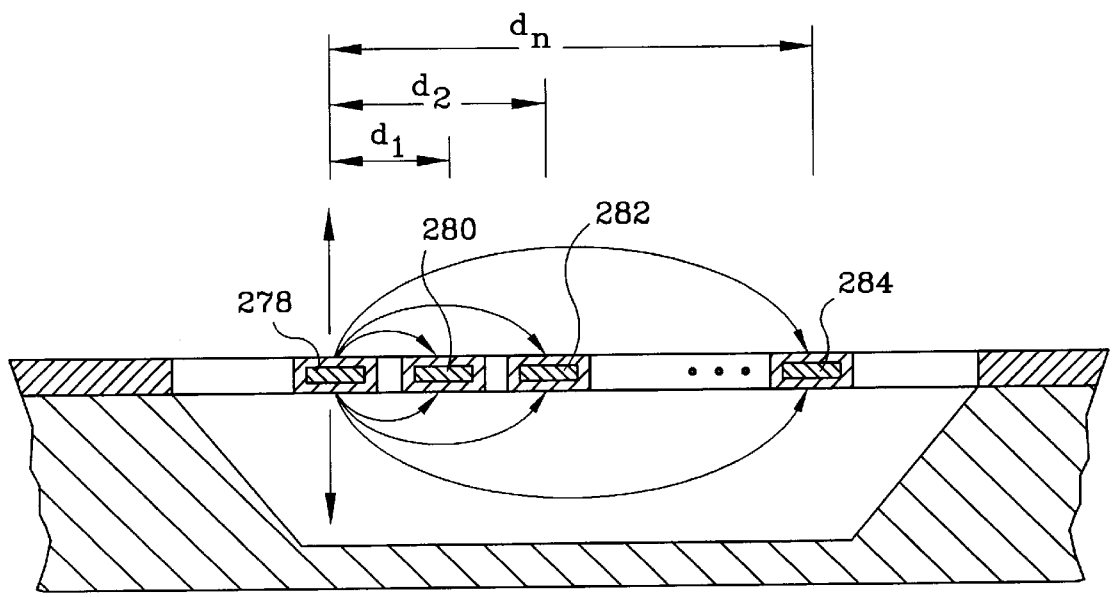
FIG. 7 is a third illustrative cross sectional view of a microbridge sensor in accordance with the present invention having more than two downstream sensor elements.

Again referring to selected fluid velocity measurements, and to reduce the possible negative effects of thermal diffusivity and other properties of the fluid at low flow rates, it is contemplated that a first set of sensor elements may be used for measuring low flow rates and another set may be used for higher flow rates. For example, in FIG. 7, those sensor that are positioned closest to the heater element, such as sensor elements 280 and 282, may be used to measure low flow rates, as the thermal diffusivity component may be negligible even at the low flow rates at the appropriate frequency. Likewise, sensor elements that are positioned further from the heater element may be used to measure the higher flow rates, including sensor 284. Using this approach, the effect of the thermal diffusivity component on the flow rate measurement may be minimized.

In addition, it is contemplated that a higher amplitude heater input signal may be provided when measuring high flow rates, and conversely, a lower amplitude heater input signal may be provided when measuring low flow rates. A higher amplitude temperature disturbance can be more easily detected, but can increases the speed of the thermal diffusivity component in the fluid. Thus, a lower amplitude heater input signal may reduce the speed of the thermal diffusivity component, and provide more accurate results at lower flow rates.

Figure 8:
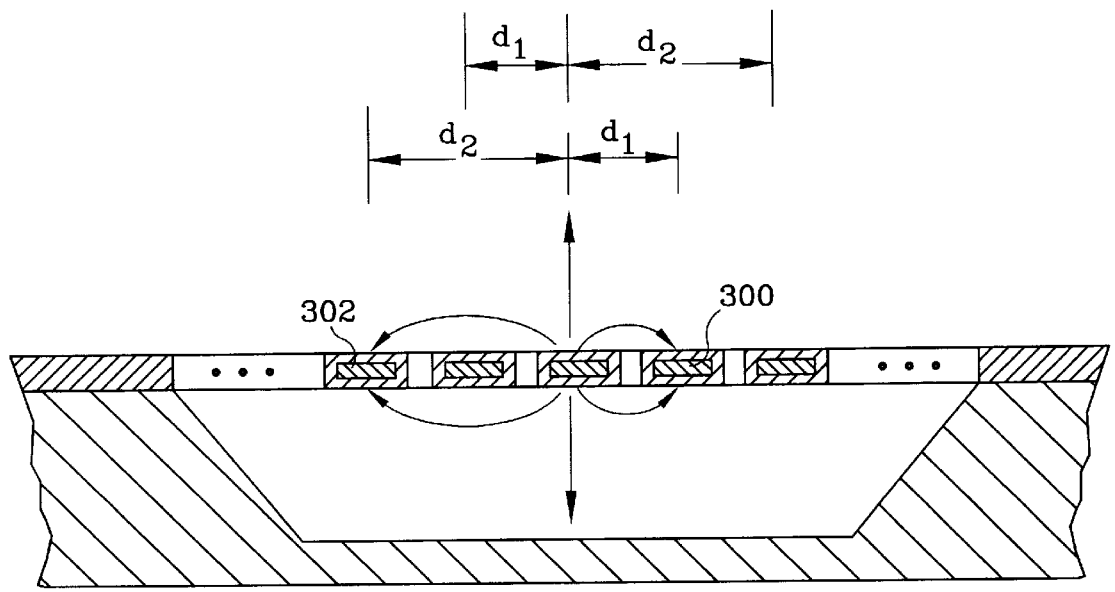
FIG. 8 is a fourth illustrative cross sectional view of a microbridge sensor in accordance with the present invention having a number of downstream and upstream sensor elements.

FIG. 8 is a fourth illustrative cross sectional view of a microbridge sensor in accordance with the present invention having a number of downstream and upstream sensor elements. In this embodiment, several pairs of sensor elements are equally spaced from the heater element both in an upstream and downstream direction. When using calibration data to measure the thermal conductivity, thermal diffusivity, specific heat and/or fluid velocity of a fluid of interest, only one heater element and one sensor element may be required. However, as discussed in more detail below, some embodiments of the present invention include a heater element and at least two spaced sensor elements 300 and 302. When measuring fluid velocity, for example, using at least two spaced sensor elements 300 and 302, only the outputs of selected sensor elements that are spaced at different distances from the heater element may be selected. This may allow the fluid velocity to be obtained relatively independently of the other fluid properties, as discussed in more detail below.

Figure 9:
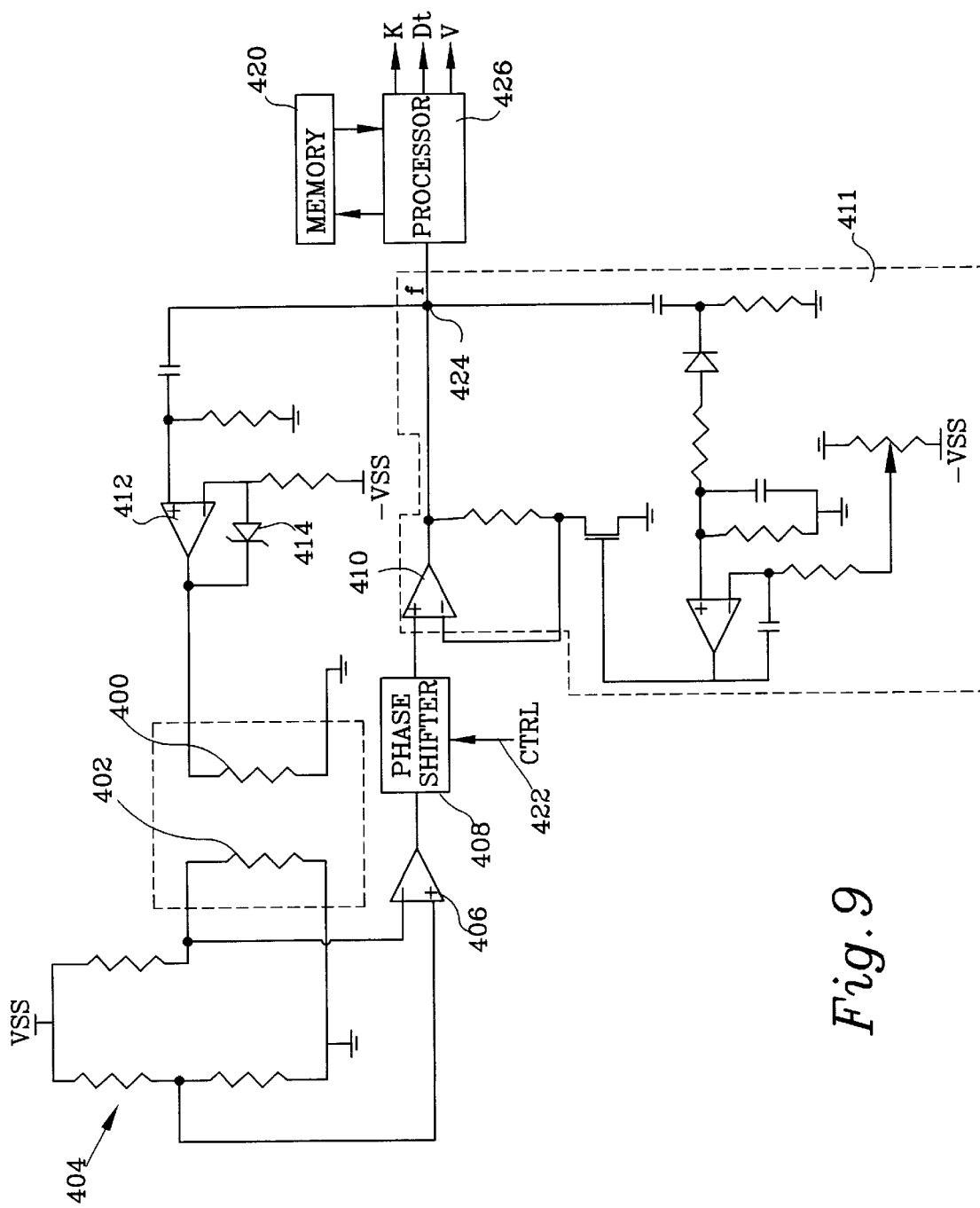
FIG. 9 is a schematic diagram of a self-oscillating sensor device in accordance with a preferred embodiment of the present invention.

FIG. 9 is a schematic diagram of a self-oscillating sensor device in accordance with a preferred embodiment of the present invention. In this embodiment, the self-oscillating fluid sensor does not require a frequency generator or a high frequency timer to determine the desired properties of a fluid of interest. Rather, the sensor self-oscillates at a frequency that is related to the transit time of a temperature disturbance through the fluid. From the transit time, selected fluid properties of the fluid can be determined.

Referring specifically to FIG. 9, a heater element 400 and a spaced sensor element 402 are disposed in and closely coupled to the fluid medium (fluid or gas) of interest. The sensor element 402 is provided in one leg of a Wheatstone bridge 404, which then senses the change in resistance of the sensor element 402.

A differential output of the Wheatstone bridge 404 is provided to an inverting differential amplifier 406, as shown. The inverting differential amplifier 406 provides a 180 degree phase shift to the sensor output signal. The result is provided to a phase shifter 408, which provides an additional phase shift to the sensor output signal. The phase shifter 408 may, for example, provide a 135 degree phase shift. Thus, in the illustrative embodiment, the inverting amplifier 406 and the phase shifter 408 provide a 315 degree phase shift to the sensor output signal.

The shifted sensor output signal is provided to amplifier 410, which is part of an automatic gain control circuit 411 to keep the loop gain equal to one. The output of amplifier 410 is provided to a heater energizer amplifier 412, which provides a heater input signal to the heater element 400. The zener diode 414 provides a DC offset to the heater input signal to eliminate any frequency doubling effect that may occur if the applied AC voltage is allowed to cross zero volts.

The inverting amplifier 406, phase shifter 408, and amplifier 410 provide a feedback path from the output of the Wheatstone bridge 404 of the sensor to the heater energizing amplifier 412. The circuit will oscillate when the total phase shift around the loop is 360 degrees, and the loop gain is greater than or equal to one. In the illustrative embodiment, this condition is satisfied at the frequency that results in a 45 degree phase shift (360−180−135=45) between the sensor element 402 and the heater element 400. That is, the sensor device oscillates at a frequency that is related to the transit time of the temperature disturbance through the fluid from the heater element 400 to the sensor element 402.

To determine the thermal conductivity, thermal diffusivity and specific heat of the fluid of interest, the sensor is preferably exposed to the fluid at substantially zero flow. In a preferred embodiment, selected calibration information that relates the frequency of oscillation (or corresponding time lag) of the sensor device to the desired fluid property is stored in memory 420. Processor 426 may receive the frequency of oscillation via interface 424 and may determine the desired fluid properties using the previously generated calibration information stored in memory 420.

As suggested in U.S. Pat. No. 4,944,035 to Aagard et al., the thermal conductivity of the fluid of interest can most effectively be determined when a substantially steady-state temperature occurs at the sensor (with negligible effects caused by thermal microconvection), and the thermal diffusivity of a fluid of interest can most effectively be determined (with input from "k") when a transient temperature change occurs at the sensor. Accordingly, it is contemplated that the phase delay introduced by the phase shifter 408 may be controllable by control signal 422 so that the frequency of oscillation is relatively low when determining the thermal conductivity of the fluid of interest, and higher when determining the thermal diffusivity of the fluid of interest.

With respect to fluid velocity, it has been found that the frequency of oscillation of the sensor device is related to the flow rate of the fluid. Again, by providing the appropriate calibration information in memory 420, the velocity of the fluid of interest may be determined from the frequency of oscillation of the sensor device.

Figure 10:
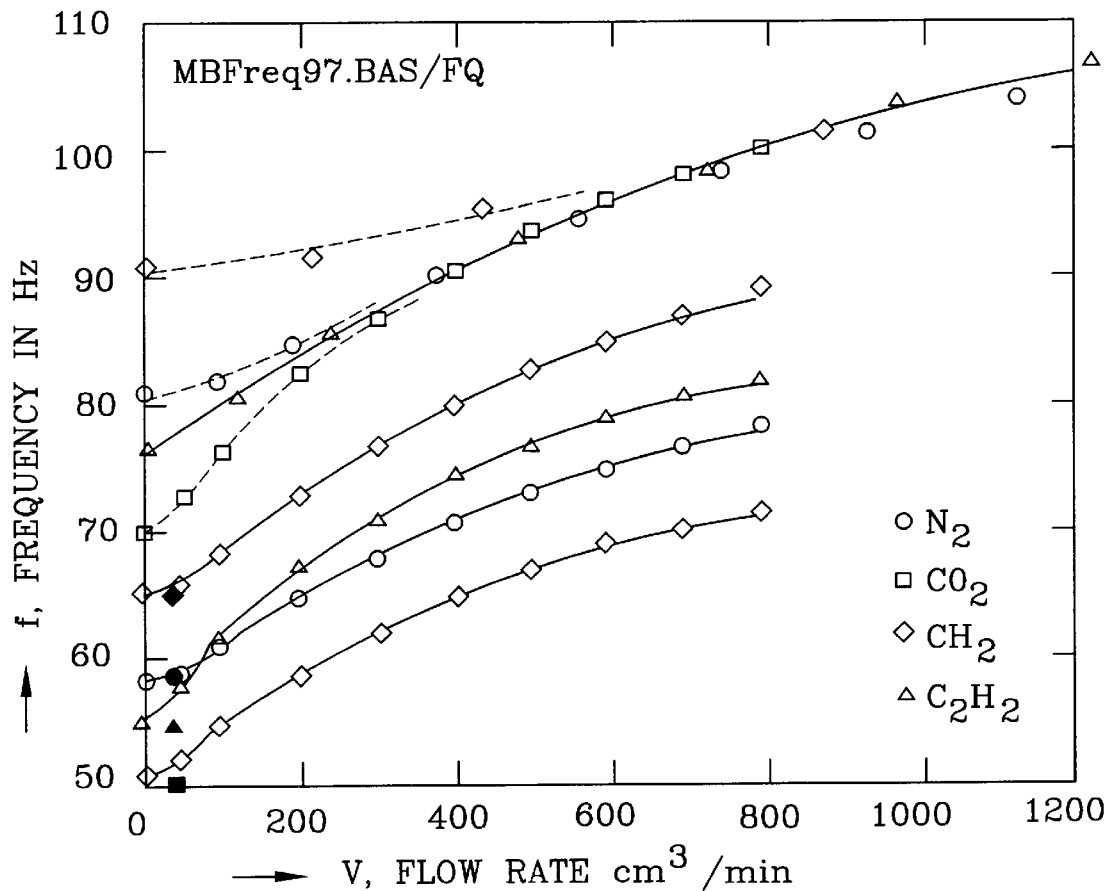
FIG. 10 is graph showing the frequency of oscillation versus flow rate for four gases using the sensor device of FIG. 9.

FIG. 10 is graph showing the frequency of oscillation versus flow rate for four known gases using the sensor device of FIG. 9. The thermal conductivity and thermal diffusivity of a fluid under test can be obtained by determining the frequency of oscillation at substantially zero flow. The frequency of oscillation must then be correlated to the thermal conductivity and/or thermal diffusivity of the fluid under test using a predetermined relation derived from calibration information of the known gases. For the illustrative embodiment, the thermal conductivity, k, of the fluid under test can be determined using the approximate relation:

$$k = 0.36\sqrt{f} \tag{1}$$

or more generally:

$$f = \left(\frac{k}{k_0}\right)^n \left(\frac{c_p}{c_{p0}}\right)^m \tag{2}$$

where f is the frequency of oscillation at substantially zero flow, k is the thermal conductivity of the fluid of interest, $k_0$ is the thermal conductivity of a calibration fluid, $c_p$ is the specific heat of the fluid of interest, and $c_{p0}$ is the specific heat of the calibration fluid. Thermal diffusivity, $D_t$, is related to k and $c_p$ by the relation $D_t = k/c_{pv}$, where $c_{pv} = c_p V_m$ and $V_m$ is the molar volume.

Equation (1) was derived by measuring the frequency of oscillation for each of four known gases $N_2$, $CO_2$, $CH_4$ and $C_2H_6$ at substantially zero flow during a calibration procedure. The frequency values for each of the four known gases are shown along the Y-axis of FIG. 10, and can be fitted to the known thermal conductivity, k, values for each of the four gases to provide the relation of equation (1). Preferably, this relation is stored in memory 420 for use by processor 426 to determine the thermal conductivity of an unknown fluid under test.

A similar procedure may be used to determine the thermal diffusivity of the fluid under test using the frequency of oscillation of the sensor device when exposed to the fluid under test at substantially zero flow. As indicated above, however, the phase delay introduced by the phase shifter 408 may be reduced using control signal 422 so that the frequency of oscillation is higher when determining the thermal diffusivity. When so provided, a relation of the form of equation (2) can be derived via a calibration procedure, similar to that described above. The resulting relation may be stored in memory 420 for used by processor 426 to determine the thermal diffusivity of the fluid under test.

Once the thermal conductivity and specific heat are determined, the thermal diffusivity, $D_t$, of the fluid under test can be determined using the relation:

$$D_t = k/c_{pv} \tag{3}$$

The flow rate of an unknown fluid can be obtained by determining the frequency of oscillation at a particular flow rate, and correlating the frequency of oscillation to the velocity of the unknown fluid using a predetermined correction factor. The correction factor is preferably determined during a calibration procedure. The calibration procedure preferably includes generating a series of curves of fluid flow versus frequency of oscillation for a number of known fluids. For example, in FIG. 10, curves are shown for four known gases $N_2$, $CO_2$, $CH_4$ and $C_2H_6$.

As can be seen, the fluid flow rate for $CH_4$ is lower than the fluid flow rate for $CO_2$ at a particular frequency of oscillation. To simplify the calculations involved, one of the known fluids is preferably selected as a reference curve. The reference curve is then stored in memory 420 as calibration information. Subsequently, a fluid under test is exposed to the sensor device under flow conditions, and the sensor device oscillates at a corresponding frequency. An uncorrected flow rate is determined from the reference curve. To provide the true flow rate for the fluid under test, a correction factor is applied to the uncorrected flow rate. An illustrative correction factor $C_v$ for the data shown in FIG. 10 is:

$$C_v = \left(\frac{k}{k_0}\right)^{-2.119} \left(\frac{c_p}{c_{p0}}\right)^{-1.188} \tag{4}$$

where k and $c_p$ are the thermal conductivity and specific heat of the unknown fluid, which may be determined as described above, and $k_0$ and $c_{p0}$ are the thermal conductivity and specific heat of the reference fluid. The corrected fluid velocity can then be determined using the relation:

$$V_c = V_u / C_v \tag{5}$$

where $V_c$ is the corrected fluid velocity, $V_u$ is the uncorrected fluid velocity, and $C_v$ is the correction factor of equation (4).

The correction factor was derived by mathematically shifting the $N_2$, $CH_4$ and $C_2H_6$ curves in the y-direction to overlay the reference $CO_2$ curve. The amount that each curve was shifted is related to the thermal conductivity and specific heat of the corresponding fluid. From this, the correction factor of equation (4) was derived. Fluid velocities computed from equation (5) were verified to be accurate to within about ±0.7 percent.

In addition to the above, it is also contemplated that the correction factor could be derived by mathematically shifting the $N_2$, $CH_4$ and $C_2H_6$ curves in the x-direction to overlay the reference $CO_2$ curve, as shown at the top of FIG. 10. In either case, an appropriate correction factor can be provided.

Figure 11:
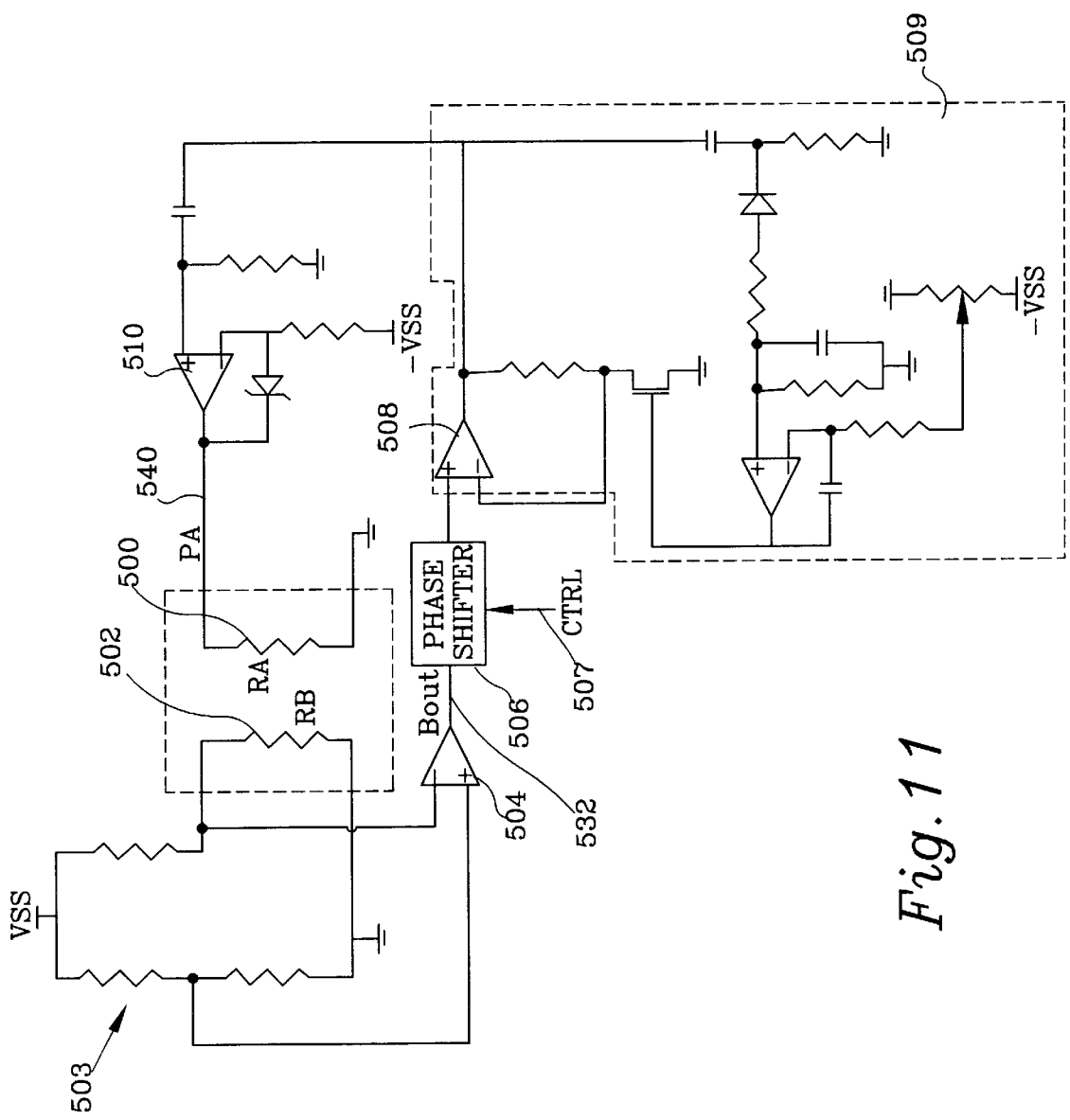
FIG. 11 is a schematic diagram of self-oscillating sensor device in accordance with another embodiment of the present invention.

FIG. 11 is a schematic diagram showing a self-oscillating sensor device in accordance with another embodiment of the present invention. A heater element 500 and a sensor element 502 are shown. The sensor element 502 is provided in one leg of a Wheatstone bridge 503, as described above. The heater element is energized by a heater energizing amplifier 510. A feedback path including inverting amplifier 504, phase shifter 506 and amplifier 508 cause the sensor device to oscillate at a frequency that is related to the phase or time lag between the heater element 500 and the sensor element 502. Using the frequency of oscillation and the phase lag between the heater element 500 and the sensor element 502, the time delay between the heater element and the sensor element can be determined. As indicated above, this configuration may eliminate the need for a frequency generator to operate the sensor.

In the embodiment shown in FIG. 9, the thermal conductivity, thermal diffusivity, specific heat and fluid velocity of a fluid of interest are determined from a phase or time lag between a heater element and a sensor element. However, the embodiment shown in FIG. 11 contemplates determining the thermal conductivity, thermal diffusivity, specific heat and velocity of a fluid of interest using a phase lag (or corresponding transit time or frequency) between a first sensor element and a second sensor element.

Figure 12:
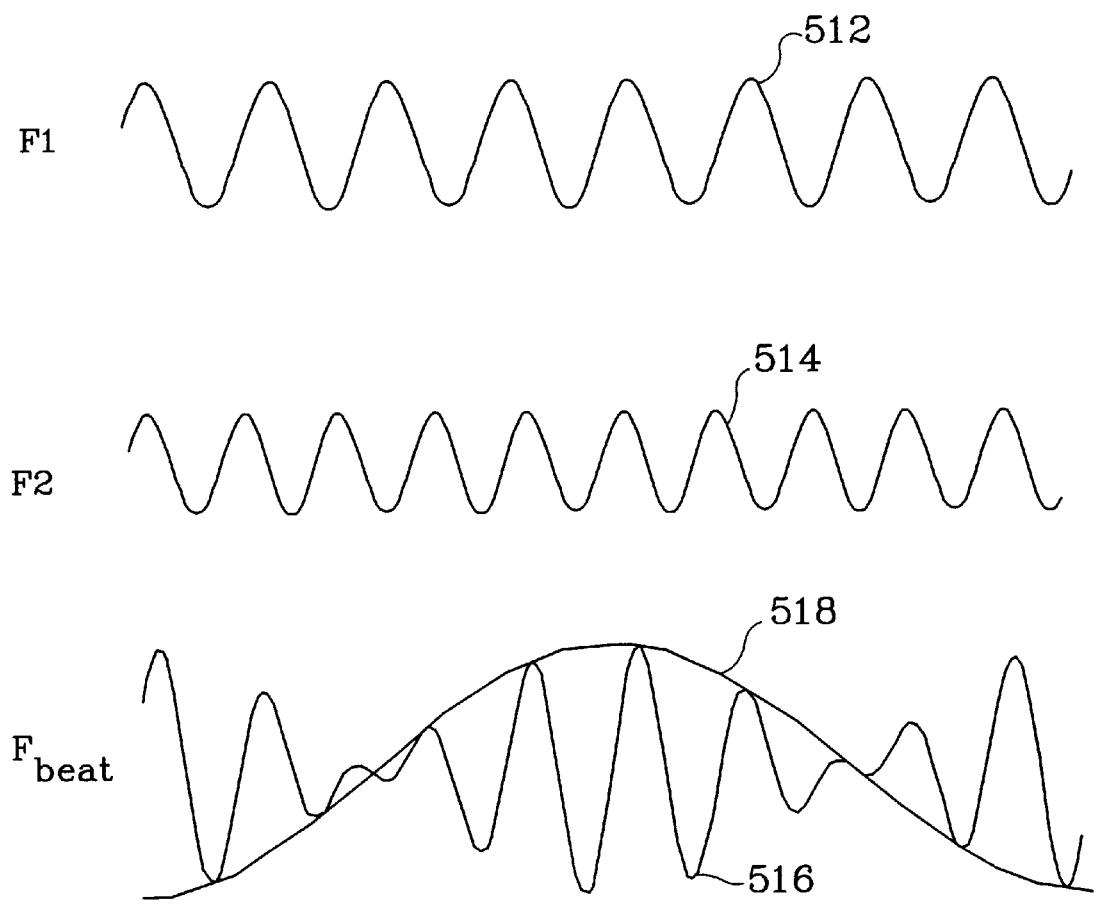
FIG. 12 is a timing chart showing oscillating frequencies for two self-oscillating sensor devices, each having a different heater-to-sensor spacing, and the resulting beat frequency from which the transit time between the sensor elements can be determined.

It is contemplated a second sensor element may also be provided in a second feedback loop similar to that shown in FIG. 11, but with a different heater-to-sensor spacing. Both the first and second feedback loops may use a common heater element, or separate heater elements. Because the heater-to-sensor spacing is different, the first feedback loop may self-oscillate at a first frequency 512 ($f_1$) and the second feedback loop may self-oscillate at a second frequency 514 ($f_2$), as more clearly shown in FIG. 12. A beat frequency can then be determined from the first frequency 512 and the second frequency 514 by adding, multiplying or otherwise combining the frequency curves 512 and 514. An illustrative summation curve 516 is shown in FIG. 12, which was derived by adding the first frequency 512 and the second frequency 514. A beat frequency can then be determined from the summation curve 516. In FIG. 12, the beat frequency is illustrated by sine wave 518 which has a frequency of $f_2-f_1$. The transit time from the first sensor element to the second sensor element can then be determined from the beat frequency.

In yet another illustrative embodiment, two similar constructed self-oscillating heater/sensor pairs may be provided, one subject to substantially zero flow conditions and the other subject to flow conditions. For example, one heater/sensor pair may be provided in sensor 210 of FIG. 4, and the other may be provided in sensor 222. A first frequency of oscillation is determined for the heater/sensor pair that is subject to substantially zero flow. A second frequency of oscillation is determined for the heater/sensor pair that is subject to flow conditions. Because the structure and spacings are preferably substantially equal for both heater/sensor pairs, a relatively accurate transit time from the first sensor element to the second sensor element can be determined from the beat frequency of the first and second oscillation frequencies.

It is also contemplated that a second transit time between a first sensor element and a third sensor element may be determined, preferably in manner as described above. For example, a first and a third sensor element may be included in separate feedback loops. The second transit time may then be determined from a beat frequency between the oscillation frequencies of the first and third sensor elements. From the beat frequency, the second transit time can be determined.

Likewise, it is contemplated that a two self-oscillating heater/sensor pairs each having a different heater-to-sensor spacing may be provided, for example on sensor element 210 of FIG. 4, and subject to substantially zero flow. The two-self oscillating heater/sensor pairs may have separate heater elements or a common heater element. Two corresponding similarly constructed self-oscillating heater/sensor pairs may be provided, for example on sensor element 222 of FIG. 4, and subjected to flow conditions. Because the structure and spacings of the corresponding heater/sensor pairs are preferably substantially identical, both a first transit time and a second transit time can be determined from the beat frequencies of the corresponding oscillation frequencies under flow and no-flow conditions.

More specifically, two self-oscillating heater/sensor pairs may be provided on sensor element 210 of FIG. 4. Each heater/sensor pair has a different heater-to-sensor spacing so that each heater/sensor pair oscillates at a different frequency (e.g. $f_a$ and $f_b$), both of which correspond to substantially zero flow conditions. Two similarly constructed self-oscillating heater/sensor pairs may be provided on sensor element 222 of FIG. 4. Each of these heater/sensor pairs then oscillate at two different frequencies (e.g. $f_c$ and $f_d$), both of which correspond to flow conditions. The first transit time from the first sensor element to the second sensor element may then be determined using the relation $\Delta z_1 = 1/(2\pi^*(f_c-f_a))$. Likewise, the second transit time from the first sensor to a third sensor may be determined using the relation $\Delta z_1 = 1/(2\pi^*(f_d-f_b))$.

Alternatively, only one self-oscillating heater/sensor pair is provided in sensor element 210 of FIG. 4. By varying the phase lag of phase shifter 408, two different oscillation frequencies $f_a$-$f_b$ may be obtained under substantially zero flow conditions. Likewise, another self-oscillating heater/sensor pair may be provided in sensor element 222 of FIG. 4. By varying the phase lag of corresponding phase shifter, two different oscillation frequencies $f_c$-$f_d$ may be obtained under flow conditions. As described above, these frequencies can be used to compute the thermal conductivity, thermal diffusivity, specific heat and velocity of the fluid of interest.

Figure 13:
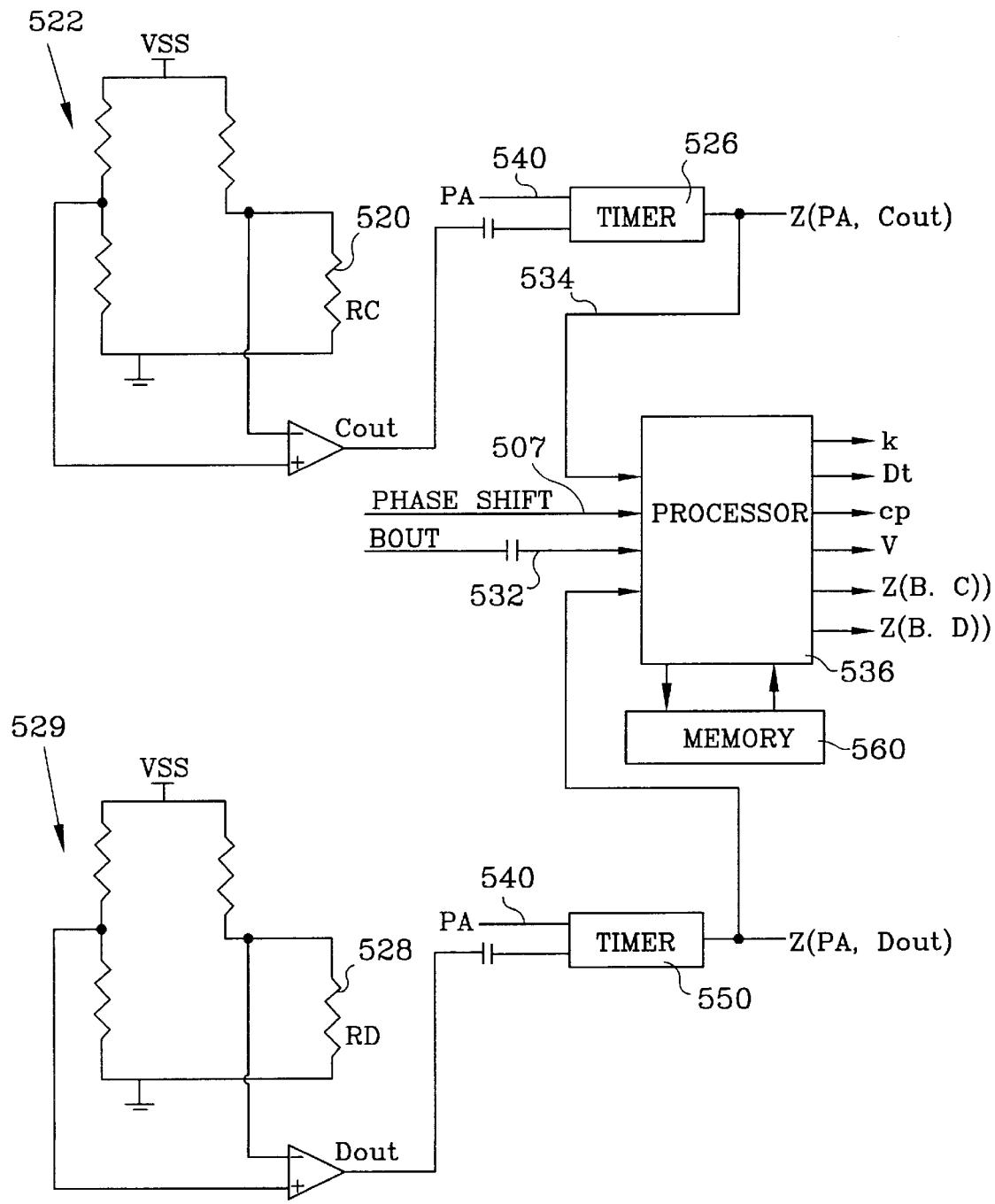
FIG. 13 is a schematic diagram of two additional sensor elements, preferably for use in combination with the embodiment of FIG. 11.

Another embodiment for determining the first and/or second transit times is shown in FIG. 13, which is a schematic diagram of two additional sensor elements, preferably for use in combination with the embodiment of FIG. 11. A second sensor element 520 incorporated into one leg of a Wheatstone Bridge 522. The second sensor element 520 is preferably thermally coupled to the fluid of interest and spaced from the first sensor element 502 of FIG. 11. A first transit time corresponding to the time required for the temperature disturbance to travel from the first sensor element 502 to the second sensor element 520 is determined by: determining a first delay between the heater input signal (or temperature response of the heater means) and the corresponding resistance change of the first sensor element 502; determining a second delay between the heater input signal (or temperature response of the heater means) and the corresponding resistance change of a second sensor element; and subtracting the two to obtain the desired first transit time.

The first delay can be determined using any number of means including providing a feedback path as described above between the heater element 500 and the first sensor element 502, and relating the frequency of oscillation to the delay therebetween, or by providing a high frequency timer (not shown). The second delay may be determined between the heater input signal 540 (or temperature response of the heater means) and the corresponding resistance change of the second sensor element 520. The second delay can be determined using any number of means, but in this embodiment by using a high frequency timer 526. The first transit time is then determined by subtracting the first delay from the second delay.

Figure 14:
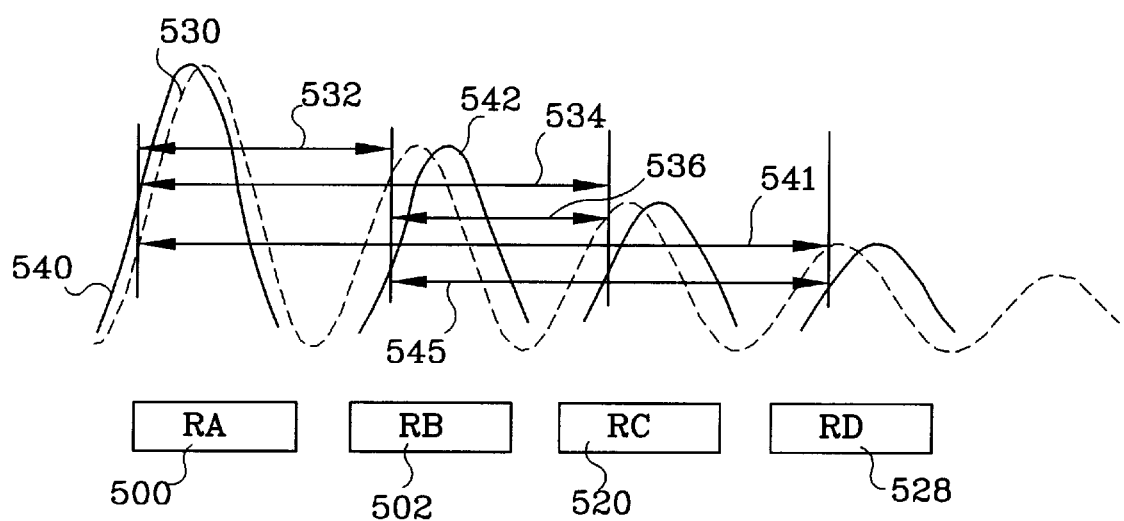
FIG. 14 is timing chart showing the delays measured by the embodiment of FIG. 13.

The calculation of the first transit time is shown in greater detail in FIG. 14. The heater element (RA) 500 introduces a temperature disturbance in the fluid, generally shown at 530. The first sensor element (RB) 502 senses the temperature disturbance a first delay time 532 later, and the second sensor element (RC) 520 senses the temperature disturbance a second delay time 534 later. The first transit time 536 between the first sensor element (RB) 502 and the second sensor element (RC) 520 can then be determined by subtracting the first delay 532 from the second delay 534.

An advantage of this approach is that several potential error sources in the phase differential measurement are canceled from the measurement, thereby increasing the accuracy of the measurement. One such error source is the non-zero heater time lag that typically exists between the heater input signal and the elevated temperature response of the heater element (and thus the fluid). The heater time lag is shown between the heater energizing signal (PA) 540 provided by the heater energizing amplifier 510 and the fluid temperature curve 530 of FIG. 14.

Another potential error source is the non-zero sensor time lag that typically exists between the arrival of the temperature disturbance at the sensor element and the corresponding resistive response of the sensor element. That is, the temperature of the sensor element typically does not react instantaneously to a temperature change in the fluid, primarily due to the sensors non-zero thermal mass. The sensor time lag is shown between the fluid temperature curve 530 and the sensor resistive response 542 of FIG. 14. By subtracting the first delay 532 from the second delay 534, many of the potential error sources are effectively canceled, thereby resulting in a more accurate transit time measurement.

If the fluid is at substantially zero flow, the first transit time 534 may be used to calculate the thermal conductivity, thermal diffusivity and/or specific heat of a fluid of interest. This may be accomplished by providing calibration information from which a relation relating the first transit time and the desired fluid property. The phase delay introduced by the phase shifter 506 may be reduced using control signal 507 to increase the frequency of oscillation of the sensor device when determining the thermal diffusivity of the fluid under test.

The phase shift provided by phase shifter 506 may be provided to processor 536 via interface 507. By knowing the phase shift introduced by inverting amplifier 504 (180 degrees in the example shown) and the phase shift introduced by phase shifter 506, the phase shift between the heater element 500 and first sensor element 502 can be determined by processor 536. Likewise, the output signal BOUT 532 (see FIG. 11) may also be provided to processor 536 from which the frequency of oscillation of the sensor device can be determined. Using the phase shift between the heater element 500 and first sensor element 502 and the frequency of oscillation, processor 536 may determine the delay between the heater element 500 and the sensor element 502. Finally, the delay between the heater element 500 and the second sensor element 520, provided by high frequency timer 526, may be provided to processor 536 via interface 534.

Processor 536 preferably subtracts the first delay time between the heater element 500 and the first sensor element 502 from the second delay time between the heater element 500 and the second sensor element 520 to provide the first transit time from the first sensor element 502 to the second sensor element 520. Using a relation that relates the first transit time to the thermal conductivity and/or thermal diffusivity of the fluid under test, as described above, the thermal conductivity and/or thermal diffusivity therefor may be determined. For example, and as more fully described in U.S. patent application Ser. No. 09/001,530, filed Dec. 31, 1997, entitled "TIME LAG APPROACH FOR MEASURING THERMAL CONDUCTIVITY AND SPECIFIC HEAT", the thermal diffusivity, $D_t$, can be determined using the relation:

$$D_t = d^2/4\Delta z \quad (6)$$

where,
  d=the distance between the first sensor element and the second sensor element,
  $\Delta z$=the first transit time.

The relation of equation (6) assumes that the frequency of oscillation provided by the sensor device is sufficiently high to induce transient elevated temperature disturbances at the second sensor element.

If the fluid is under flow conditions, the first transit time may be used to calculated the velocity of the fluid of interest by deriving a relation between the first transit time and the velocity of the fluid under test. This is preferably accomplished by using previously generated calibration information, which processor 536 then uses to provide the fluid velocity.

It is also contemplated that a second transit time between the first sensor element 502 and a third sensor element 528 may be determined in a like manner. That is, a third delay may be determined between the heater input signal (or temperature response of the heater means) and the third sensor element 528 using high frequency timer 550. The second transit time between the first sensor element 520 and the third sensor element 528 is preferably determined by subtracting the first delay between the heater input signal (or temperature response of the heater means) and the first sensor element 502 from the third delay between the heater input signal (or temperature response of the heater means) and the third sensor element 528.

The calculation of the second transit time is shown in greater detail in FIG. 14. The heater element (RA) 500 introduces a temperature disturbance in the fluid, generally shown at 530. The first sensor element (RB) 502 senses the temperature disturbance a first delay time 532 later, and the third sensor element (RD) 528 senses the temperature disturbance a third delay time 541 later. The second transit time 545 between the first sensor element (RB) 502 and the third sensor element (RC) 528 can then be determined by subtracting the first delay 532 from the third delay 541.

The velocity of the fluid of interest can then be determined, relatively independently of the fluid properties, using the first transit time 536 and second transit time 545 using the relation:

$$v = \{(d_1^2/\Delta z_1 - d_2^2/\Delta z_2)/(\Delta z_1 - \Delta z_2)\}^{1/2} \quad (7)$$

where,
  $d_1$=the distance between the first sensor element and the second sensor element;
  $d_2$=the distance between the second sensor element and the third sensor element, where $|d_1| \neq |d_2|$;
  $\Delta z_1$=the first transit time from the first sensor element to the second sensor element; and
  $\Delta z_2$=the second transit time from the first sensor element to the third sensor element.

A further discussion and derivation of equation (7) can be found in co-pending U.S. patent application Ser. No. 09/002, 157, filed Dec. 31, 1999, entitled "TIME LAG APPROACH FOR MEASURING FLUID VELOCITY", which has been incorporated herein by reference.

Figure 15:
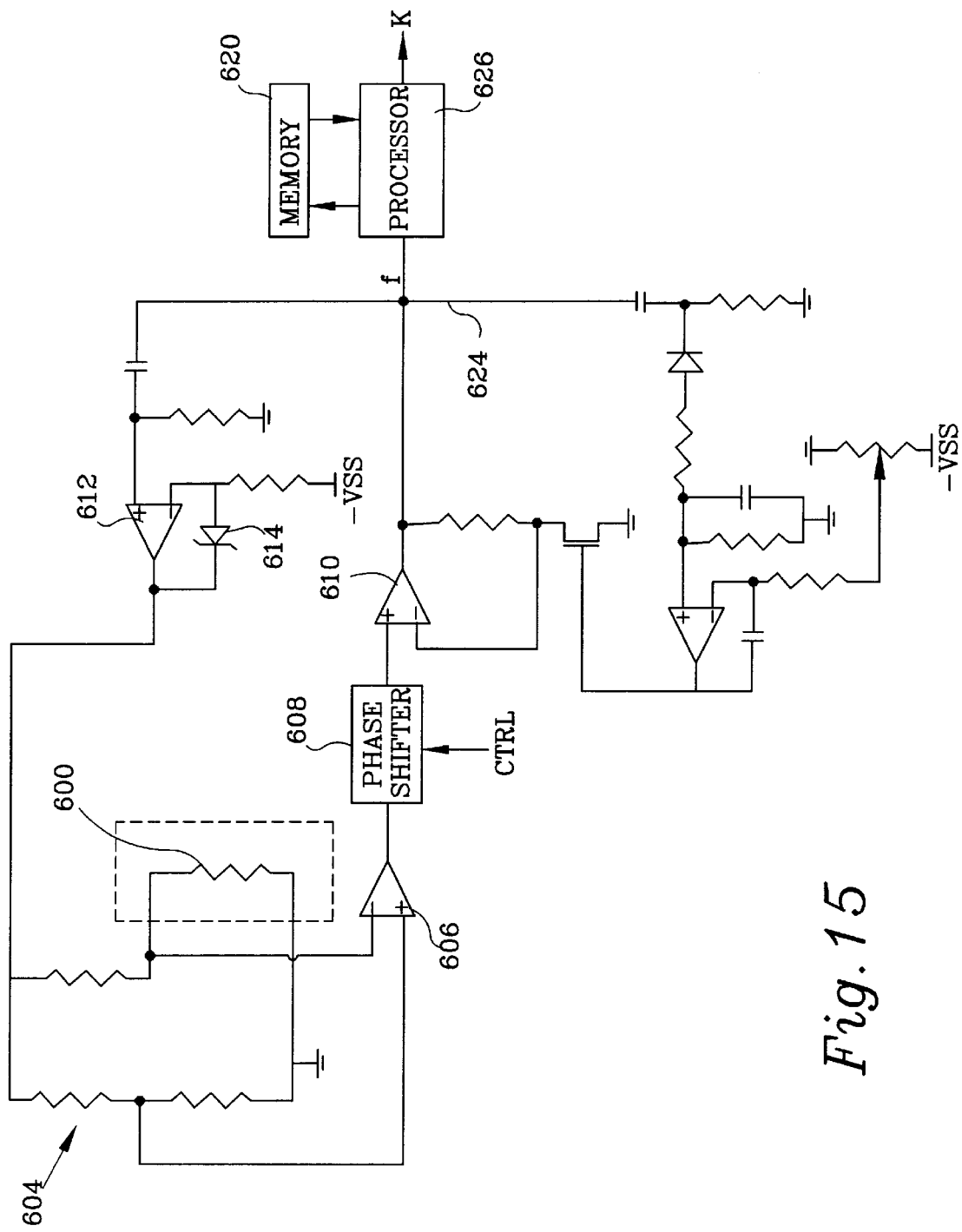
FIG. 15 is a schematic diagram of first illustrative self-oscillating sensor device having only a heater element for determining the thermal conductivity of a fluid of interest.

FIG. 15 is a schematic diagram of first illustrative self-oscillating sensor device that enables the thermal conductivity of a fluid of interest to be determined with only a single sensor element, namely a heater element. As further discussed in co-pending U.S. patent application Ser. No. 09/002,156, entitled "METHOD AND APPARATUS FOR MEASURING SELECTED PROPERTIES OF A FLUID OF INTEREST USING A SINGLE HEATER ELEMENT", a heater element that is thermally coupled to a fluid of interest typically has a non-zero heater time lag between the power input signal that is provided to the heater element and the corresponding temperature response of the heater element (and thus fluid). The heater time lag is typically dominated by the thermal conductivity, k, of the fluid of interest, at least for microbridge structures. Thus, the thermal conductivity, k, of the fluid of interest can be derived from the phase or time lag of a single heater element.

To determine the phase lag of a heater element, a circuit similar to that shown in FIG. 9 is provided, but only a single heater element 600 provided. The heater element 600 is disposed in and closely coupled to the fluid medium (fluid or gas) of interest. In the embodiment shown in FIG. 15, the heater element 600 is provided in one leg of a Wheatstone bridge 604. The Wheatstone bridge 604 allows power to be provided to the heater element 600, and simultaneously senses the change in resistance, and thus the temperature, of the heater element 600.

A differential output of the Wheatstone bridge 604 is provided to an inverting differential amplifier 606. The inverting differential amplifier 606 provides a 180 degree phase shift to the differential output signal. The result is provided to a phase shifter 608, which provides an additional phase shift to the differential output signal. The phase shifter 608 may, for example, provide a 135 degree phase shift. Thus, in the illustrative embodiment, the inverting amplifier 606 and the phase shifter 608 provide a 315 degree phase shift to the differential output signal.

The shifted differential output signal is provided to amplifier 610, which is part of an automatic gain control circuit as described above. The output of amplifier 610 is provided to a heater energizer amplifier 612, which provides a heater input signal to the heater element 600 via the Wheatstone bridge 604. The zener diode 614 provides a DC offset to the heater input signal to eliminate any frequency doubling effect that may occur if the applied AC voltage is allowed to cross zero volts.

The inverting amplifier 606, phase shifter 608, and amplifier 610 provide a feedback path from the differential output of the Wheatstone bridge 604 to the heater energizing amplifier 612. The circuit will thus oscillate when the total phase shift around the loop is 360 degrees, and the loop gain is greater than or equal to one. In the illustrative embodiment, this condition is satisfied at the frequency that results in a 45 degree phase shift (360−180−135=45) between the applied power signal to the Wheatstone bridge 604 and the resistive (temperature) response of the heater element 600. That is, the circuit will oscillate at a frequency that is related to the internal phase lag of the heater element 600.

To determine the thermal conductivity, the heater element 600 is preferably exposed to the fluid at substantially zero flow. Processor 626 may receive the frequency of oscillation of the circuit via interface 624, and compute the time lag associated with the internal phase lag of the heater element 600. From the time lag, the thermal conductivity of the fluid of interest can be determined using the relation:

$$k = (-2\pi f c_{pv} t / \tan(\gamma) - h_3) L_1 \qquad (8)$$

where, f=frequency of oscillation, $c_{pv}$=specific heat per unit volume for the combined heater film and support member, t=thickness of the heater film, $h_3$=coefficient of conductive heat transfer to the substrate, $L_1$=characteristic length of thermal conduction from the heater means into the fluid phase, γ=phase lag between application of the input power signal and a predetermined resistance change of the heater element (γ=Δz·2πf), Δz=time lag between application of the input power signal and a predetermined resistance change of the heater element.

The derivation of equation (8) can be found in co-pending U.S. patent application Ser. No. 09/002,156, filed Dec. 31, 1999, entitled "METHOD AND APPARATUS FOR MEASURING SELECTED PROPERTIES OF A FLUID OF INTEREST USING A SINGLE HEATER ELEMENT", which has been incorporated herein by reference.

Alternatively, selected calibration information that relates the frequency of oscillation (or corresponding time lag) of the circuit to the thermal conductivity of the fluid may be stored in memory 620. Processor 626 may receive the frequency of oscillation via interface 624 and determine the thermal conductivity, k, of the fluid of interest using the previously generated calibration information stored in memory 620.

Figure 16:
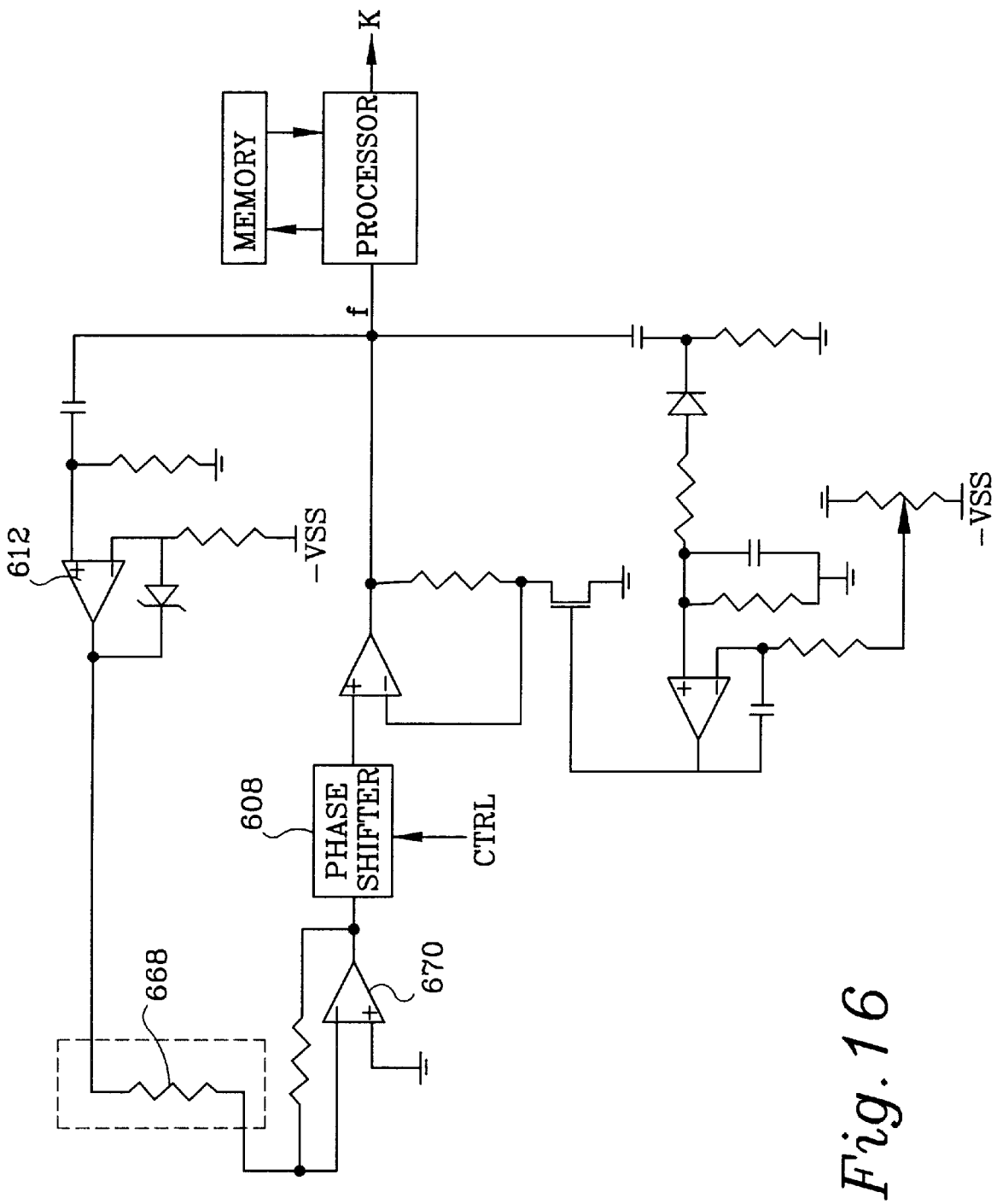
FIG. 16 is a schematic diagram of second illustrative self-oscillating sensor device having only a heater element for determining the thermal conductivity of a fluid of interest.

Another illustrative self-oscillating sensor device having only a heater element 668 is shown in FIG. 16. In this embodiment, the power input signal provided by heater energizer amplifier 612 is directly applied to the heater element 668, rather than via a Wheatstone bridge. Amplifier 670 senses and amplifies the current that passes through the heater element 668, and provides a corresponding voltage to phase shifter 608. This embodiment thus eliminates the need for the Wheatstone bridge of FIG. 15. Accordingly, the number of electrical components may be reduced relative to the embodiment of FIG. 15, while still providing a circuit that oscillates at a frequency that is related to the thermal conductivity of the fluid of interest.

Having thus described the preferred embodiments of the present invention, those of skill in the art will readily appreciate that the teachings found herein may be applied to yet other embodiments within the scope of the claims hereto attached.

What is claimed is:

1. Apparatus for determining a selected property of a fluid of interest, comprising:

heater means in thermal communication with the fluid of interest, said heater means having a resistance that changes with temperature;

heater energizing means connected to said heater means for energizing said heater means;

sensor means in thermal communication with the fluid of interest and spaced from said heater means, said sensor means having a resistance that changes with temperature;

feedback means coupled to said sensor means and said heater energizing means for causing said heater energizing means to energize said heater means a predetermined time after the resistance of said sensor means changes by a predetermined amount;

said heater energizing means, heater means, sensor means, and feedback means forming a closed loop that oscillates at a frequency that is related to a time lag between the energizing of said heater means and the change of resistance of said sensor means by the predetermined amount; and determining means for determining a selected property of the fluid of interest using the frequency of oscillation.

2. Apparatus according to claim 1 wherein said determining means uses the frequency of oscillation to determine a time lag between the energizing of said heater means and the predetermined change of resistance of said sensor means.

3. Apparatus according to claim 1 wherein the fluid of interest is substantially at zero flow.

4. Apparatus according to claim 3 wherein said determining means determines the thermal conductivity, k, of the fluid of interest using frequency of oscillation.

5. Apparatus according to claim 4 further comprising memory means for storing predetermined calibration information, wherein the determining means calculates the thermal conductivity, k, of the fluid of interest using the calibration information and the frequency of oscillation.

6. Apparatus according to claim 2 wherein the predetermined time delay provided by said feedback means is controllable.

7. Apparatus according to claim 3 wherein said determining means determines the thermal diffusivity, $D_t$, of the fluid of interest using the frequency of oscillation.

8. Apparatus according to claim 3 further comprising memory means for storing predetermined calibration information, wherein the determining means calculates the thermal diffusivity, $D_t$, of the fluid of interest using the calibration information and the frequency of oscillation.

9. Apparatus according to claim 8 wherein the predetermined time delay provided by said feedback means is controllable.

10. Apparatus according to claim 9 wherein the predetermined time delay provided by said feedback means is less when determining the thermal diffusivity, $D_t$, of the fluid of interest than when determining the thermal conductivity, k, of the fluid of interest.

11. Apparatus according to claim 7 wherein said determining means further determines the specific heat $c_{pv}$ of the fluid of interest based on the relation:

$$c_{pv}=k/D_t$$

where, k=the thermal conductivity of the fluid of interest,
$D_t$=the thermal diffusivity $D_t$ of the fluid of interest.

12. Apparatus according to claim 3 wherein said determining means determines the fluid velocity, v, of the fluid of interest using the frequency of oscillation.

13. Apparatus according to claim 12 further comprising memory means for storing predetermined calibration information, wherein said determining means determines the fluid velocity, v, of the fluid of interest using the calibration information and the frequency of oscillation.

14. A method for determining selected properties of a fluid of interest, comprising the steps of:

providing power to a heater means via a heater energizing means, wherein said heater means is thermally coupled to the fluid of interest;

sensing a resulting temperature change a first distance from said heater means via a sensor means;

energizing said heater means with said heater energizing means a predetermined time after the resulting temperature change is sensed by said sensor means such that a closed loop is formed that oscillates at a frequency that is related to a time lag between the energizing of said heater means and the sensing of the corresponding temperature change by said sensor means; and determining a selected property of the fluid of interest using the frequency of oscillation.

15. A method according to claim 14 wherein the selected property of the fluid of interest is selected from the group consisting of thermal conductivity, thermal diffusivity, specific heat and fluid velocity.

16. Apparatus for determining a selected property of a fluid of interest, comprising:

heater means in thermal communication with the fluid of interest, said heater means having a resistance that changes with temperature;

heater energizing means connected to said heater means for energizing said heater means to provide a temperature disturbance in the fluid of interest;

at least two sensor means in thermal communication with the fluid of interest, each of the at least two sensor means spaced a different distance from said heater means, and each having a resistance that changes with temperature;

first transit time means for determining a first transit time for the temperature disturbance to travel from the first sensor means to the second sensor means, wherein said first sensor means is spaced from said second sensor means by a first distance; and determining means for determining the selected property of the fluid of interest using the first transit time.

17. Apparatus according to claim 16 wherein said selected property of the fluid of interest is selected from the group consisting of thermal conductivity, thermal diffusivity, specific heat and fluid velocity.

18. Apparatus according to claim 16 wherein said selected property is the fluid velocity, v, of the fluid of interest.

19. Apparatus according to claim 18 wherein said determining means determines the fluid velocity, v, of the fluid of interest by using previously generated calibration information of fluid velocity versus the first transit time for a calibration fluid.

20. Apparatus according to claim 16 further comprising:

third sensor means in thermal communication with the fluid of interest and having a resistance that changes with temperature;

second transit time means for determining a second transit time for the temperature disturbance to travel from the first sensor means to the third sensor means, wherein said first sensor means is spaced from said third sensor means by a second distance; and determining means for determining the fluid velocity, v, of the fluid of interest using the first transit time and the second transit time.

21. Apparatus according to claim 20 wherein said determining means determines the fluid velocity, v, of the fluid of interest using the relation:

$$v=\{(d_1^2/\Delta z_1-d_2^2/\Delta z_2)/(\Delta z_1-\Delta z_2)\}^{0.5}$$

where, $d_1$=the first distance;
$d_2$=the second distance;
$\Delta z_1$=the first transit time; and
$\Delta z_2$=the second transit time.

22. Apparatus for determining the fluid velocity, v, of a fluid of interest, comprising:

heater means in thermal communication with the fluid of interest, said heater means having a resistance that changes with temperature;

heater energizing means connected to said heater means for energizing said heater means;

at least two sensor means in thermal communication with the fluid of interest, each of the at least two sensor means spaced a different distance from said heater means, and each having a resistance that changes with temperature;

feedback means coupled to a first one of the at least two sensor means and said heater energizing means for causing said heater energizing means to energize said heater means a predetermined time after the resistance of said first sensor means changes by a predetermined amount;

said heater energizing means, heater means, first sensor means, and feedback means forming a closed loop that oscillates at a frequency that is related to a first time lag between the energizing of said heater means and the change of resistance of said first sensor means;

first time lag means for determining a second time lag that corresponds to the time lag between said heater means and a corresponding resistance change in a second one of the at least two sensor means; and determining means for determining the fluid velocity, v, of the fluid of interest using the first time lag and the second time lag.

23. Apparatus according to claim 22 wherein said determining means subtracts the first time lag from the second time lag to determine a first transit time from the first sensor to the second sensor.

24. Apparatus according to claim 23 wherein said first sensor means is spaced from the second sensor means by a first distance, and wherein said determining means divides the first distance by said first transit time to calculate the fluid velocity, v, of the fluid of interest.

25. Apparatus according to claim 23 wherein said determining means determines the fluid velocity, v, of the fluid of interest by using a previously generated calibration curve of fluid velocity versus the first transit time.

26. Apparatus according to claim 22 further comprising:
third sensor means;
second time lag means for determining a third time lag that corresponds to the time lag between said heater means and a corresponding resistance change in the third sensor means; and
said determining means determines the fluid velocity, v, of the fluid of interest using the first time lag, the second time lag and the third time lag.

27. Apparatus according to claim 26 wherein said determining means subtracts the first time lag from the second time lag to determine a first transit time from the first sensor to the second sensor, and subtracts the first time lag from the third time lag to determine a second transit time from the first sensor to the third sensor.

28. Apparatus according to claim 27 wherein said first sensor means is spaced from the second sensor means by a first distance, and said first sensor means is spaced from the third sensor means by a second distance, and wherein said determining means calculated the fluid velocity, v, of the fluid of interest using the first transit time, the second transit time, the first distance and the second distance.

29. Apparatus according to claim 28 wherein said determining means calculates the fluid velocity, v, of the fluid of interest using the relation:

$$v=\{(d_1^2/\Delta z_1 - d_2^2/\Delta z_2)/(\Delta z_1 - \Delta z_2)\}^{0.5}$$

where,
$d_1$=the first distance;
$d_2$=the second distance;
$\Delta z_1$=the first transit time; and
$\Delta z_2$=the second transit time.

30. A method for determining a selected property of a fluid of interest, comprising the steps of:
providing a temperature disturbance in the fluid of interest by energizing a heater means that is thermally coupled to the fluid of interest;
determining a first transit time for the temperature disturbance to travel from a first sensor means to a second sensor means, wherein said first sensor means is spaced from said second sensor means by a first distance; and determining the selected property of the fluid of interest using the first transit time.

31. A method according to claim 30 wherein said determining step determines the thermal diffusivity $D_t$ of the fluid of interest based on the relation:

$$D_t = d^2/4\Delta z$$

where,
d=the first distance,
$\Delta z$=the first transit time.

32. A method according to claim 30 wherein said determining step determines the fluid velocity, v, of the fluid of interest by using a previously generated calibration curve of fluid velocity versus the first transit time.

33. A method according to claim 30 further comprising the steps of:
determining a second transit time for the temperature disturbance to travel from the first sensor means to a third sensor means, wherein said first sensor means is spaced from said third sensor means by a second distance.

34. A method according to claim 33 wherein said determining step determines the fluid velocity, v, of the fluid of interest using the first transit time and the second transit time.

35. A method according to claim 34 wherein said determining means calculates the fluid velocity, v, of the fluid of interest using the relation:

$$v=\{(d_1^2/\Delta z_1 - d_2^2/\Delta z_2)/(\Delta z_1 - \Delta z_2)\}^{0.5}$$

where,
$d_1$=the first distance;
$d_2$=the second distance;
$\Delta z_1$=the first transit time; and
$\Delta z_2$=the second transit time.

36. A method for determining the fluid velocity, v, of a fluid of interest, comprising:
providing a temperature disturbance in the fluid of interest by energizing a heater means that is thermal coupled to the fluid of interest using a heater energizing means;
sensing the temperature disturbance at a first location spaced from said heater means via a first sensor means;
energizing said heater means with said heater energizing means a predetermined time after the temperature disturbance is sensed by the first sensor means such that a closed loop is formed that oscillates at a frequency that is related to a first time lag between the energizing of said heater means and the sensing of the temperature disturbance by the first sensor means;
determining a second time lag that corresponds to the time lag between the energizing of said heater means and the sensing of the temperature disturbance at a second location spaced from said heat means by a second sensor means; and
determining the fluid velocity, v, of the fluid of interest using the first time lag and the second time lag.

37. A method according to claim 36 wherein said determining step subtracts the first time lag from the second time lag to determine a first transit time from the first sensor means to the second sensor means.

38. A method according to claim 37 wherein the first and second sensor means are spaced apart by a first distance, and wherein said determining step divides the first distance by said first transit time to calculate the fluid velocity, v, of the fluid of interest.

39. A method according to claim 37 wherein said determining step determines the fluid velocity, v, of the fluid of interest by using a previously generated calibration curve of fluid velocity versus the first transit time.

40. A method according to claim 36 further comprising the steps of:
   determining a third time lag that corresponds to the time lag between the energizing of said heater means and the sensing of the temperature disturbance at a third location spaced from said heater means by a third sensor means; and
   said determining step determining the fluid velocity, v, of the fluid of interest using the first time lag, the second time lag and the third time lag.

41. A method according to claim 40 wherein said determining step subtracts the first time lag from the second time lag to determine a first transit time from the first sensor means to the second sensor means, and subtracts the first time lag from the third time lag to determine a second transit time from the first sensor means to the third sensor means.

42. A method according to claim 41 wherein said second and third sensor means are spaced apart by a second distance, and wherein said determining step determines the fluid velocity, v, of the fluid of interest using the first transit time, the second transit time, the first distance and the second distance.

43. A method according to claim 42 wherein said determining step calculates the fluid velocity, v, of the fluid of interest using the relation:

$$v = \{(d_1^2/\Delta z_1 - d_2^2/\Delta z_2)/(\Delta z_1 - \Delta z_2)\}^{0.5}$$

where,
   $d_1$=the first distance;
   $d_2$=the second distance;
   $\Delta z_1$=the first transit time; and
   $\Delta z_2$=the second transit time.

44. Apparatus for determining a selected property of a fluid of interest, comprising:
   heater means in thermal communication with the fluid of interest, said heater means having a resistance that changes with temperature;
   heater energizing means connected to said heater means for energizing said heater means;
   at least two sensor means in thermal communication with the fluid of interest, each of the at least two sensor means spaced a different distance from said heater means, and each having a resistance that changes with temperature;
   first feedback means coupled to a first one of the at least two sensor means and said heater energizing means for causing said heater energizing means to energize said heater means a predetermined time after the resistance of said first sensor means changes by a predetermined amount;
   said heater energizing means, heater means, first sensor means, and first feedback means forming a closed loop that oscillates at a first frequency that is related to a first time lag between the energizing of said heater means and the change of resistance of said first sensor means;
   second feedback means coupled to a second one of the at least two sensor means and said heater energizing means for causing said heater energizing means to energize said heater means a predetermined time after the resistance of said second sensor means changes by a predetermined amount;
   said heater energizing means, heater means, second sensor means, and second feedback means forming a closed loop that oscillates at a second frequency that is related to a second time lag between the energizing of said heater means and the change of resistance of said second sensor means;
   beat frequency means for determining a beat frequency of the first and second oscillation frequencies; and
   determining means for determining the selected property of the fluid of interest from the beat frequency.

45. Apparatus for determining a selected property of a fluid of interest, comprising:
   first heater means in thermal communication with the fluid of interest, said first heater means having a resistance that changes with temperature;
   first heater energizing means connected to said first heater means for energizing said first heater means;
   second heater means in thermal communication with the fluid of interest, said second heater means having a resistance that changes with temperature;
   second heater energizing means connected to said second heater means for energizing said second heater means;
   at least two sensor means in thermal communication with the fluid of interest, each of the at least two sensor means spaced a different distance from a corresponding one of said first and second heater means, and each having a resistance that changes with temperature;
   first feedback means coupled to a first one of the at least two sensor means and said first heater energizing means for causing said first heater energizing means to energize said first heater means a predetermined time after the resistance of said first sensor means changes by a predetermined amount;
   said first heater energizing means, first heater means, first sensor means, and first feedback means forming a closed loop that oscillates at a first frequency that is related to a first time lag between the energizing of said first heater means and the change of resistance of said first sensor means;
   second feedback means coupled to a second one of the at least two sensor means and said second heater energizing means for causing said second heater energizing means to energize said second heater means a predetermined time after the resistance of said second sensor means changes by a predetermined amount;
   said second heater energizing means, second heater means, second sensor means, and second feedback means forming a closed loop that oscillates at a second frequency that is related to a second time lag between the energizing of said second heater means and the change of resistance of said second sensor means;
   beat frequency means for determining a beat frequency of the first and second oscillation frequencies; and
   determining means for determining the selected property of the fluid of interest from the beat frequency.

46. Apparatus for determining the thermal conductivity of a fluid of interest, comprising:
   heater means in thermal communication with the fluid of interest, said heater means having a resistance that changes with temperature;
   heater energizing means connected to said heater means for energizing said heater means;
   feedback means coupled to said heater means and said heater energizing means for causing said heater energizing means to energize said heater means a predetermined time after the resistance of said heater means changes by a predetermined amount;

said heater energizing means, heater means, and feedback means forming a closed loop that oscillates at a frequency that is related to an internal time lag between the energizing of said heater means and the change of resistance of said heater means by the predetermined amount; and determining means for determining the thermal conductivity of the fluid of interest using the frequency of oscillation.

* * * * *